United States Patent
Yamana et al.

(10) Patent No.: US 9,535,492 B2
(45) Date of Patent: Jan. 3, 2017

(54) INFORMATION PROCESSING APPARATUS, CONTROL METHOD, AND COMPUTER-READABLE RECORDING MEDIUM

(71) Applicant: FUJITSU LIMITED, Kawasaki-shi, Kanagawa (JP)

(72) Inventors: Fumiaki Yamana, Sunnyvale, CA (US); Hiroshi Kondou, Yokohama (JP); Kenji Gotsubo, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 756 days.

(21) Appl. No.: 13/855,999

(22) Filed: Apr. 3, 2013

(65) Prior Publication Data

US 2013/0268791 A1    Oct. 10, 2013

(30) Foreign Application Priority Data

Apr. 6, 2012 (JP) ................................. 2012-087680

(51) Int. Cl.
*G06F 1/32* (2006.01)
*G06F 9/50* (2006.01)

(52) U.S. Cl.
CPC ........... *G06F 1/3293* (2013.01); *G06F 1/3206* (2013.01); *G06F 1/3287* (2013.01); *G06F 9/5094* (2013.01); *Y02B 60/142* (2013.01)

(58) Field of Classification Search
CPC .......... G06F 1/3287; G06F 1/3206; H02J 3/14
See application file for complete search history.

(56) References Cited

U.S. PATENT DOCUMENTS

| | | | |
|---|---|---|---|
| 2005/0015632 A1 | 1/2005 | Chheda et al. | |
| 2006/0156041 A1 | 7/2006 | Zaretsky et al. | |
| 2006/0259793 A1* | 11/2006 | Moore | G06F 1/206 713/300 |
| 2007/0067656 A1* | 3/2007 | Ranganathan | G06F 1/3203 713/320 |
| 2009/0132842 A1* | 5/2009 | Brey | G06F 1/3203 713/322 |

(Continued)

FOREIGN PATENT DOCUMENTS

| | | |
|---|---|---|
| JP | 8-329007 | 12/1996 |
| JP | 2001-312337 | 11/2001 |

(Continued)

OTHER PUBLICATIONS

Japanese Office Action mailed Dec. 22, 2015 in related Japanese Application No. 2012-087680.

*Primary Examiner* — Kim Huynh
*Assistant Examiner* — Brandon Kinsey
(74) *Attorney, Agent, or Firm* — Staas & Halsey LLP

(57) ABSTRACT

An information processing apparatus includes a memory and a processor coupled to the memory. The processor is configured to: determine whether or not a difference between a total of power consumption values of physical or virtual computers and a preset upper-limit value satisfies a certain condition; select, in ascending order of priorities stored in a first storage and set based on details of processing executed by the computers, any of the computers as a target whose power consumption is to be reduced, when the difference satisfies the certain condition; and switch the computer selected to a state in which the power consumption is reduced.

16 Claims, 19 Drawing Sheets

(56) References Cited

U.S. PATENT DOCUMENTS

| | | | |
|---|---|---|---|
| 2009/0164994 A1* | 6/2009 | Vasilevsky | G06F 9/45533 718/1 |
| 2009/0187776 A1 | 7/2009 | Baba et al. | |
| 2010/0205469 A1* | 8/2010 | McCarthy | G06F 9/5061 713/324 |
| 2011/0138147 A1* | 6/2011 | Knowles | G06F 9/5016 711/170 |
| 2012/0054741 A1* | 3/2012 | Ali | H04L 9/3231 718/1 |
| 2012/0098340 A1* | 4/2012 | Yokoyama | H02J 3/14 307/31 |
| 2012/0166825 A1* | 6/2012 | Blackburn | G06F 1/3203 713/310 |
| 2012/0194146 A1* | 8/2012 | Longacre | G06F 1/266 323/234 |
| 2013/0226362 A1* | 8/2013 | Jagadishprasad | G06F 9/5094 700/297 |

FOREIGN PATENT DOCUMENTS

| | | |
|---|---|---|
| JP | 2005-038425 | 2/2005 |
| JP | 2006-195986 | 7/2006 |
| JP | 2007-233894 | 9/2007 |
| JP | 2009-175788 | 8/2009 |

\* cited by examiner

FIG. 6

| PHYSICAL PARTITION NAME | OPERATING TIME | AVERAGE CPU USAGE RATE |
|---|---|---|
| DB | 60 DAY | 40% |
| AP1 | 30 DAY | 10% |
| AP2 | 15 DAY | 30% |
| WEB1 | 10 DAY | 30% |
| WEB2 | 7 DAY | 50% |
| WEB3 | 5 DAY | 40% |
| TEST | 0 DAY | 30% |

FIG. 7

| PHYSICAL PARTITION NAME | SETTING ORDER | MODE SWITCHING | NUMBER OF INSTALLED CPUs | MINIMUM NUMBER OF CPUs | INSTALLED MEMORY CAPACITY | MINIMUM MEMORY CAPACITY | FORCED STOPPING | STOPPING METHOD |
|---|---|---|---|---|---|---|---|---|
| DB | 1 | OFF | 16 | 16 | 32 GB | 32 GB | DISABLED | – |
| AP1 | 2 | ON | 8 | 4 | 16 GB | 8 GB | DISABLED | – |
| AP2 | 2 | ON | 8 | 0 | 16 GB | 0 GB | ENABLED | SHUTDOWN |
| WEB1 | 3 | ON | 4 | 2 | 8 GB | 4 GB | DISABLED | – |
| WEB2 | 3 | ON | 4 | 0 | 8 GB | 0 GB | ENABLED | SUSPENSION |
| WEB3 | 3 | ON | 4 | 0 | 8 GB | 0 GB | ENABLED | SUSPENSION |
| TEST | 4 | ON | 4 | 0 | 8 GB | 0 GB | ENABLED | POWER-OFF |

| PHYSICAL PARTITION NAME | PRIORITY | NUMBER OF POWER-SAVING CPUs | POWER-SAVING MEMORY CAPACITY | STOPPING STATUS | STOP-TIME POWER CONSUMPTION VALUE |
|---|---|---|---|---|---|
| DB | 1 | 0 | 0 GB | – | – |
| AP1 | 2 | 0 | 0 GB | – | – |
| AP2 | 3 | 0 | 0 GB | – | – |
| WEB1 | 4 | 0 | 0 GB | – | – |
| WEB2 | 5 | 3 | 0 GB | – | – |
| WEB3 | 6 | 4 | 4 GB | – | – |
| TEST | 7 | 4 | 8 GB | – | – |

| COMPONENT | UNIT NUMBER | NORMAL-MODE POWER CONSUMPTION VALUE | POWER-SAVING-MODE POWER CONSUMPTION VALUE | AMOUNT OF REDUCTION |
|---|---|---|---|---|
| CPU | 1 CPU | 100 WATT | 60 WATT | 40 WATT |
| | 2 CPU | 160 WATT | 90 WATT | 70 WATT |
| | 4 CPU | 320 WATT | 170 WATT | 150 WATT |
| | 8 CPU | 640 WATT | 330 WATT | 310 WATT |
| | 16 CPU | 128 WATT | 650 WATT | 630 WATT |
| MEMORY | 1 GB | 10 WATT | 6 WATT | 4 WATT |
| | 2 GB | 16 WATT | 9 WATT | 7 WATT |
| | 4 GB | 32 WATT | 17 WATT | 15 WATT |
| | 8 GB | 64 WATT | 33 WATT | 31 WATT |
| | 16 GB | 128 WATT | 65 WATT | 63 WATT |

FIG. 18

| COMPONENT | OPERATING FREQUENCY | RATE | POWER CONSUMPTION VALUE |
|---|---|---|---|
| CPU | 3.0 GHz | 100 % | 100 Watt |
| | 2.7 GHz | 90 % | 92 Watt |
| | 2.4 GHz | 80 % | 84 Watt |
| | 2.1 GHz | 70 % | 76 Watt |
| | 1.8 GHz | 60 % | 68 Watt |
| | 1.5 GHz | 50 % | 60 Watt |
| | 1.2 GHz | 40 % | 52 Watt |
| | 0.9 GHz | 30 % | 46 Watt |
| | 0.6 GHz | 20 % | 38 Watt |
| | 0.3 GHz | 10 % | 30 Watt |

INFORMATION PROCESSING APPARATUS, CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2012-087680 filed on Apr. 6, 2012, the entire contents of which are incorporated herein by reference.

FIELD

The embodiments discussed herein are related to an information processing apparatus, a control method, and a computer-readable recording medium.

BACKGROUND

In recent years, computer systems (hereinafter simply referred to as "systems") having a power-capping function for controlling power consumption so that it does not exceed a maximum allowable power value (an upper-limit value) set by users have come into widespread use. In one exemplary form of the power capping, when the power consumption exceeds its upper limit, the operating frequency of a CPU is automatically reduced or the operation mode of memory is switched to a power-saving mode to control the power used by the system so that it is smaller than or equal to the upper-limit value. In another exemplary form, when a duration during which the power consumption exceeds the upper-limit value exceeds a preset maximum allowable time (a guarantee period), the system is forcibly stopped and the power supply is shut off.

The use of the power capping function allows the power consumption to be restricted to a preset range, thus making it possible to systematically control the power consumption.

However, if control based on the power capping is randomly performed, an event that is not preferable in terms of the performance of system operation may occur.

Accordingly, among systems that perform control to reduce the operating frequency of a CPU so that the power consumption is smaller than or equal to the upper limit, one system is adapted to perform control so that the operation frequency decreases by an amount corresponding to the power consumption exceeding the upper-limit value in order to ensure that the operating frequency of the CPU does not decrease excessively.

Another system is also adapted to equally reduce the operating frequencies of all CPUs by dividing the power consumption exceeding the upper-limit value by the number of CPUs. In such a system, however, there is a possibility that the operating frequencies of all the CPUs decrease significantly when the amount of the excessive power consumption increases. Thus, the system performance may decline considerably.

Accordingly, another system is adapted to perform control to monitor loads (for example, usage rates) of components (CPU, memory, and so on) therein so that the power consumptions of the components with lower loads are reduced with higher priorities. More specifically, such a system is adapted so that the operating frequency of a CPU assigned to a component having a low load is reduced with higher priority and the operation mode of memory for a component whose usage rate is low is switched to a power-saving mode with higher priority.

Examples of the related art include Japanese Laid-open Patent Publication No. 2007-233894 and Japanese Laid-open Patent Publication No. 2009-175788.

SUMMARY

According to an aspect of the invention, an information processing apparatus includes memory and a processor coupled to the memory. The processor is configured to: determine whether or not a difference between a total of power consumption values of physical or virtual computers and a preset upper-limit value satisfies a certain condition; select, in ascending order of priorities stored in a first storage and set based on details of processing executed by the computers, any of the computers as a target whose power consumption is to be reduced, when the difference satisfies the certain condition; and switch the computer selected to a state in which the power consumption is reduced.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an exemplary configuration of a monitor-information storage unit;

FIG. 7 is a table illustrating an exemplary configuration of a system-information storage unit;

FIG. 8 is a table illustrating an exemplary configuration of a control-state information storage unit;

FIG. 11 is a table illustrating an exemplary configuration of a power-consumption-information storage unit;

FIG. 18 is a table illustrating a second exemplary configuration of the power-consumption-information storage unit.

DESCRIPTION OF EMBODIMENTS

Figure 1:
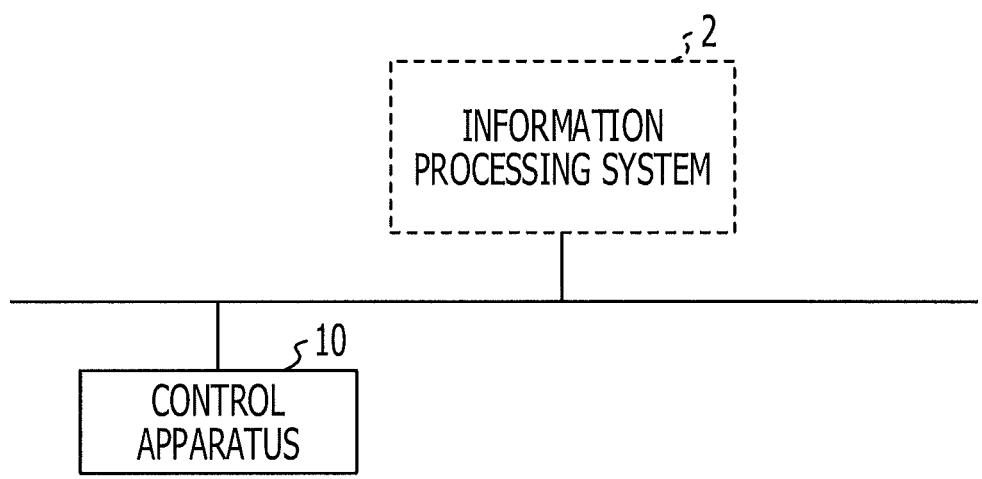
FIG. 1 is a block diagram illustrating an exemplary system configuration in embodiments disclosed herein.

Embodiments disclosed herein will be described below with reference to the accompanying drawings. FIG. 1 is a block diagram illustrating an exemplary system configuration in the embodiments disclosed herein. In FIG. 1, an information processing system 2 and a control apparatus 10 can communicate with each other through a network, such as a local area network (LAN) or an internal connection.

The information processing system 2 is a single computer or a cluster of multiple computers. In the embodiments disclosed herein, the information processing system 2 is a computer system whose power consumption is to be controlled. The computers included in the information processing system 2 may or may not be functionally associated with each other.

The control apparatus 10 may be a computer that executes control so that the power consumption of the information processing system 2 does not exceed a preset range or so that a state in which the power consumption exceeds the preset range does not continue for a large amount of time.

Figure 2:
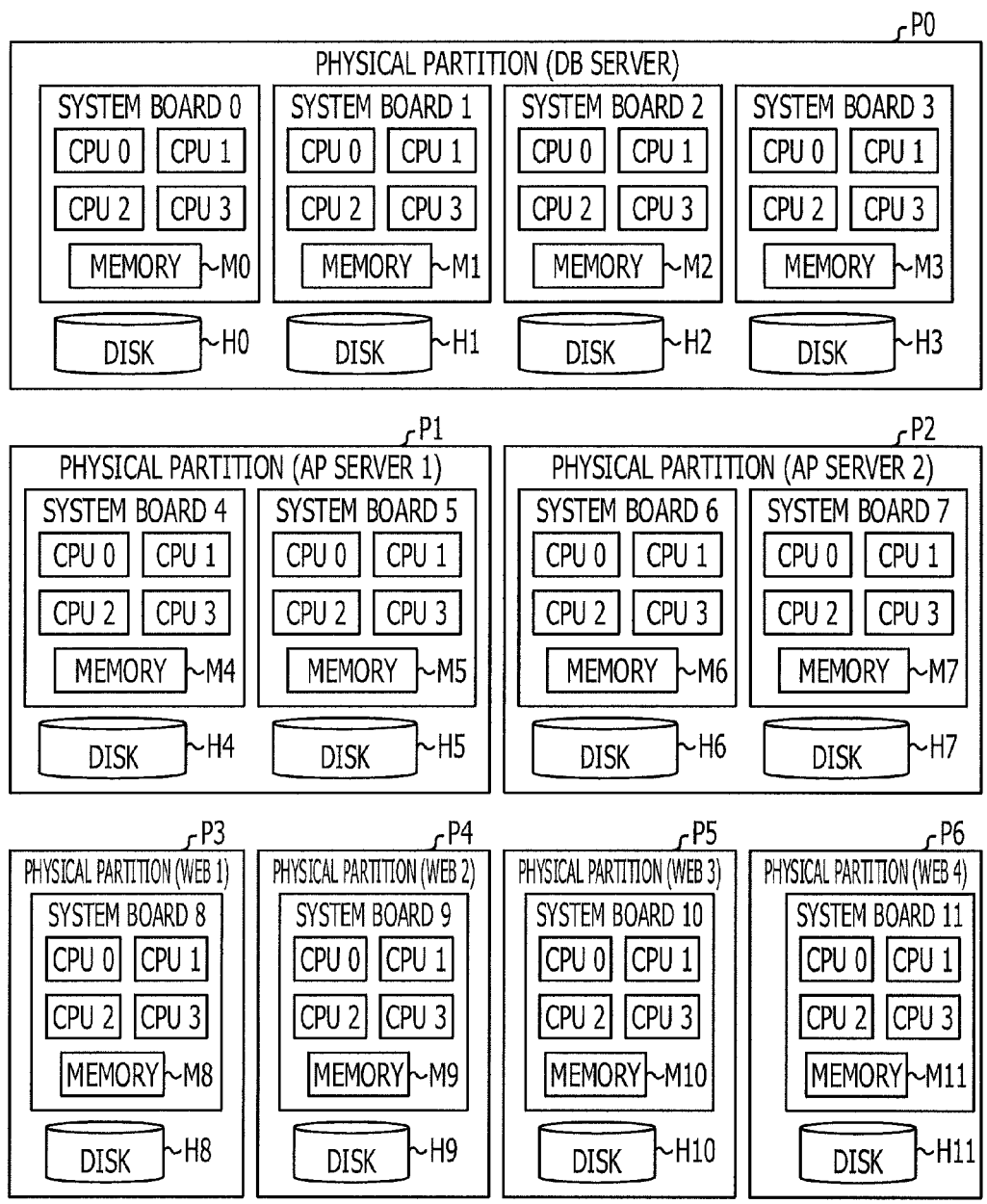
FIG. 2 is a block diagram illustrating an exemplary configuration of an information processing system in a first embodiment.

FIG. 2 is a block diagram illustrating an exemplary configuration of the information processing system in a first embodiment. As illustrated in FIG. 2, the information processing system 2 includes seven physical partitions P, namely, physical partitions P0 to P6. Each physical partition P includes one or more system boards and one or more disks H. For example, the physical partition P0 includes four system boards 0 to 3 and four disks H0 to H3. One system board includes four CPUs and one memory M.

However, the configurations of the system boards and the disks and the number of elements included in each physical partition P may be different from those illustrated in FIG. 2. For example, one physical partition P may be replaced with one computer. Startup and stopping may be performed for each physical partition P.

Each physical partition P has designated functions or roles. More specifically, the physical partition P0 functions as a database server (a DB server). The physical partitions P1 and P2 function as application servers (AP servers). The physical partitions P3 to P5 function as web servers. The physical partition P6 functions as a server for tests. The server for tests is used to test, for example, a software program under development.

Figure 3:
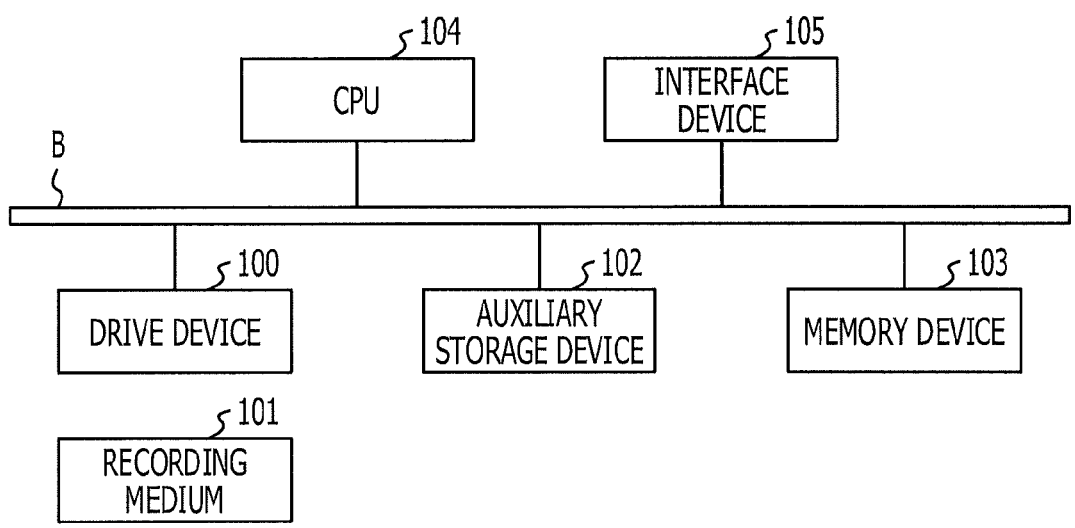
FIG. 3 is a block diagram illustrating an exemplary hardware configuration of a control apparatus in the first embodiment.

FIG. 3 is a block diagram illustrating an exemplary hardware configuration of the control apparatus in the first embodiment. The control apparatus 10 in FIG. 3 includes a drive device 100, an auxiliary storage device 102, a memory device 103, a CPU 104, and an interface device 105, which are interconnected through a bus B.

A program that realizes processing of the control apparatus 10 is supplied via a recording medium 101. When the recording medium 101 on which the program is recorded is loaded into the drive device 100, the program is installed from the recording medium 101 to the auxiliary storage device 102 via the drive device 100. However, the program may or may not be installed from the recording medium 101 and also may be downloaded from another computer over the network. The auxiliary storage device 102 stores therein the installed program as well as files, data, and so on.

Upon receiving a program-launching instruction, the memory device 103 reads the program from the auxiliary storage device 102 and stores it. In accordance with the program stored in the memory device 103, the CPU 104 executes functions associated with the control apparatus 10. The interface device 105 is used as an interface for connecting to the network.

One example of the recording medium 101 is a portable recording medium, such as a compact disk-read only memory (CD-ROM), a digital versatile disc (DVD), or a universal serial bus (USB) memory. One example of the auxiliary storage device 102 is a hard disk drive (HDD) or a flash memory. Each of the recording medium 101 and the auxiliary storage device 102 corresponds to a computer-readable recording medium.

Figure 4:
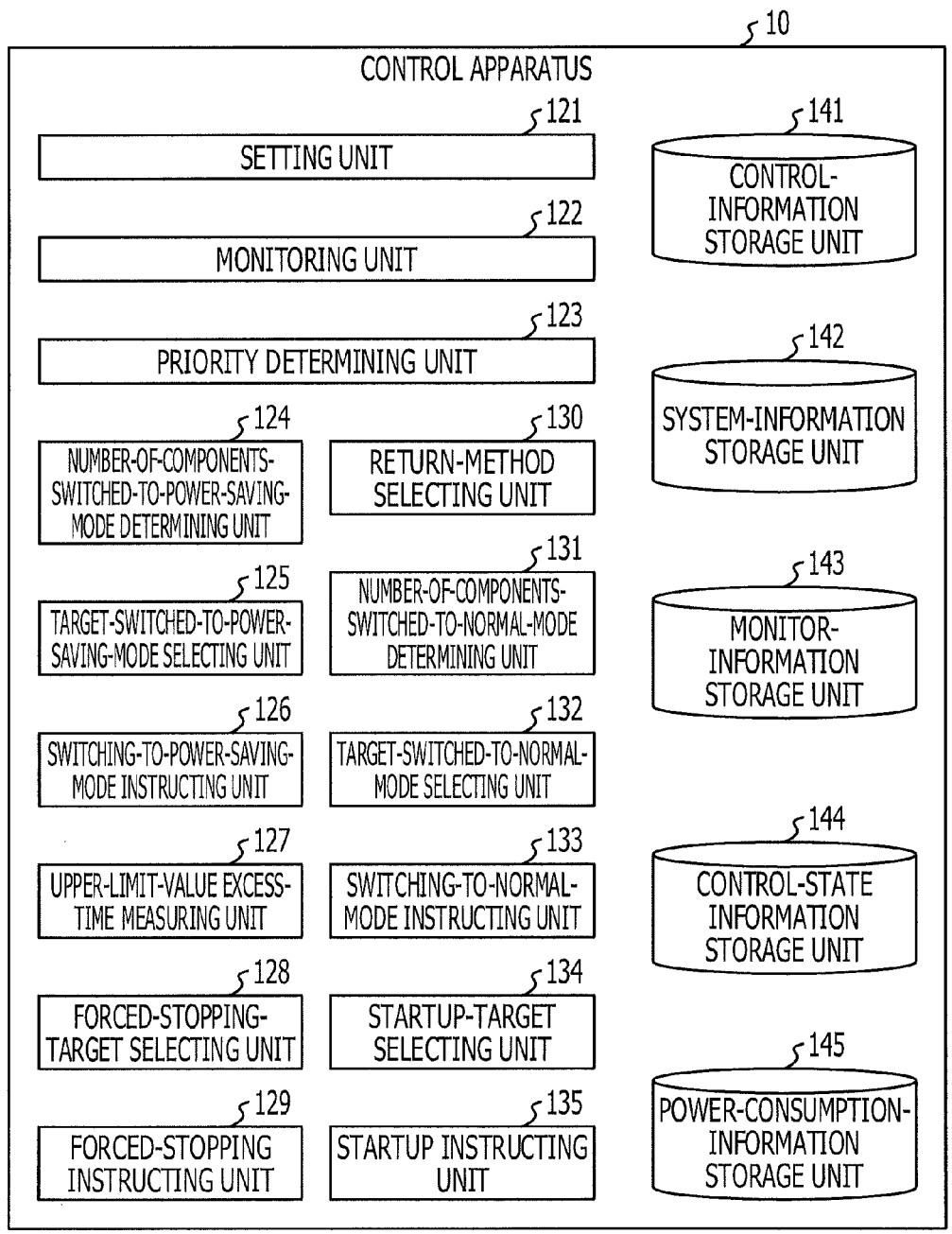
FIG. 4 is a block diagram illustrating an exemplary functional configuration of the control apparatus in the first embodiment.

FIG. 4 is a block diagram illustrating an exemplary functional configuration of the control apparatus in the first embodiment. As illustrated in FIG. 4, the control apparatus 10 includes a setting unit 121, a monitoring unit 122, a priority determining unit 123, a number-of-components-switched-to-power-saving-mode determining unit 124, a target-switched-to-power-saving-mode selecting unit 125, a switching-to-power-saving-mode instructing unit 126, an upper-limit-value excess-time measuring unit 127, a forced-stopping-target selecting unit 128, a forced-stopping instructing unit 129, a return-method selecting unit 130, a number-of-components-switched-to-normal-mode determining unit 131, a target-switched-to-normal-mode selecting unit 132, a switching-to-normal-mode instructing unit 133, a startup-target selecting unit 134, and a startup instructing unit 135. The program installed on the control apparatus 10 causes the CPU 104 to execute processing for realizing those units.

The control apparatus 10 also utilizes a control-information storage unit 141, a system-information storage unit 142, a monitor-information storage unit 143, a control-state information storage unit 144, a power-consumption-information storage unit 145, and so on. Those storage units may be realized by, for example, the auxiliary storage device 102 or by a storage device connected to the control apparatus 10 over the network.

The setting unit 121 receives input information preset by a user and stores the information in the control-information storage unit 141, the system-information storage unit 142, or the like. The control-information storage unit 141 stores therein information used for controlling the power consumption. For example, the control-information storage unit 141 stores therein the upper-limit value of allowable power consumption (the upper-limit value is hereinafter referred to as a "maximum allowable power value"), an allowable limit value of time during which the power consumption exceeds the maximum allowable power value (the time is hereinafter referred to as a "maximum allowable time"), and so on.

The monitoring unit 122 monitors the state of the information processing system 2. For example, the monitoring unit 122 obtains the power consumption values of the respective physical partitions P included in the information processing system 2. The monitoring unit 122 may also obtain the power consumption value of the entire information processing system 2. The priority determining unit 123 determines an order of priorities of the physical partitions P. The priorities may also be regarded as indicators representing the importance of details of processing performed by the corresponding physical partitions P. The priorities are used to select a target to be switched to (or, put into) a power-saving mode or to be forcibly stopped, or a target to resume from the power-saving mode to a normal mode or to be started up. The power-saving mode refers to a state in which the power consumption is reduced and is an example of an operating state in which the power consumption is relatively small. The normal mode refers to a state in which power consumption is not reduced and is one example of an operating state in which the power consumption is relatively large.

When the total of the power consumption values obtained by the monitoring unit 122 approaches the maximum allowable power value, the number-of-components-switched-to-power-saving-mode determining unit 124 determines the number of components to be switched to the power-saving mode in order to ensure that an excessive number of components do not enter the power-saving mode. The term "components" as used herein refer to hardware components that are included in each physical partition P. In the present embodiment, the components to be switched to the power-saving mode are CPUs or memories M, for the sake of convenience. However, other components having the power-saving mode may also be selected as targets to be switched to the power-saving mode. Although the components that have been switched to the power-saving mode do not stop their functions, the performance of the components is more likely to decline.

The target-switched-to-power-saving-mode selecting unit 125 selects the physical partition P to which the component number determined by the number-of-components-switched-to-power-saving-mode determining unit 124 is to be assigned. More specifically, a determination is made as to in which physical partition P and how many components are to be switched to the power-saving mode. That is, switching to the power-saving mode is performed for each component. The switching-to-power-saving-mode instructing unit 126 switches the components in the physical partition P, the components and the physical partition P being selected by the target-switched-to-power-saving-mode selecting unit 125, to the power-saving mode.

The upper-limit-value excess-time measuring unit 127 measures a duration during which the total of the power consumption values obtained by the monitoring unit 122 exceeds the maximum allowable power value (this duration is hereinafter referred to as an "upper-limit excess time").

When the upper-limit excess time is larger than or equal to the above-described maximum allowable time and any component does not enter the power-saving mode, the forced-stopping-target selecting unit 128 selects the physical partition P to be forcibly stopped. That is, forced stopping is performed for each physical partition P. This is because startup or stopping can be performed for each physical partition P. The forced-stopping instructing unit 129 forcibly stops the components selected by the forced-stopping-target selecting unit 128.

The state in which the component is in the power-saving mode or is forcibly stopped is referred to as a "reduced-power state".

When the total of the power consumption values obtained by the monitoring unit 122 falls below the maximum allowable power value, the return-method selecting unit 130 selects a method for returning from the reduced-power state. Available methods for returning from the reduced-power state include returning the component(s) that have been switched to the power-saving mode to the normal mode and starting up the forcibly stopped physical partition P.

When the return-method selecting unit 130 selects returning from the power-saving mode, the number-of-components-switched-to-normal-mode determining unit 131 determines the number of components to be switched to the normal mode. The target-switched-to-normal-mode selecting unit 132 selects the physical partition P to which the component number determined by the number-of-components-switched-to-normal-mode determining unit 131 is to be assigned. More specifically, a determination is made as to in which physical partition P and how many components are to be switched to the normal mode. The switching-to-normal-mode instructing unit 133 switches the components in the physical partition P, the components and the physical partition P being selected by the target-switched-to-normal-mode selecting unit 132, to the normal mode.

When the return-method selecting unit 130 selects starting up the physical partition P, the startup-target selecting unit 134 selects the physical partition P to be started up. The startup instructing unit 135 starts up the physical partition P selected by the startup-target selecting unit 134.

The system-information storage unit 142 stores therein configuration information of each physical partition P in the information processing system 2 and part of setting information stored by the setting unit 121.

The control-state information storage unit 144 stores therein information indicating a power-consumption control state. In accordance with the number of components, the power-consumption-information storage unit 145 stores therein information indicating the power consumption values in the normal mode, the power consumption values in the power-saving mode, and so on.

Figure 5:
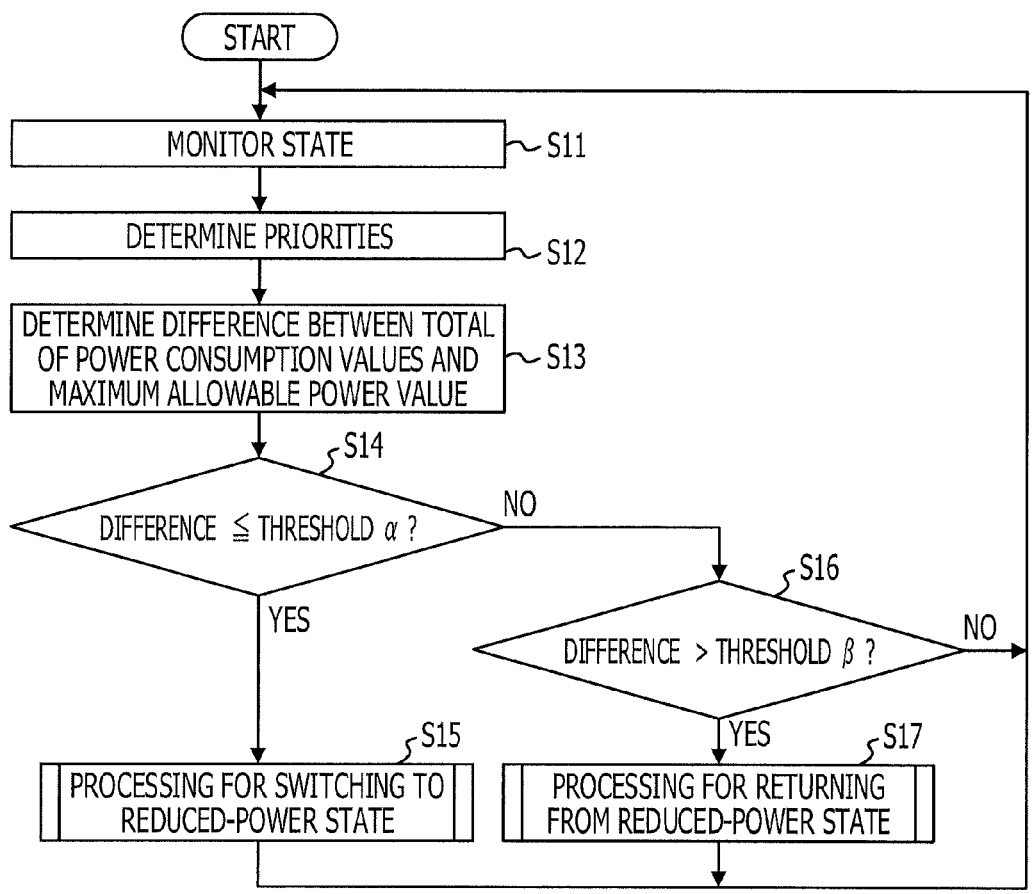
FIG. 5 is a flowchart illustrating one example of a procedure of processing for controlling the power consumption.

A description below will be given of a procedure executed by the control apparatus 10. FIG. 5 is a flowchart illustrating one example of a procedure of processing for controlling the power consumption.

In step S11, the monitoring unit 122 monitors the state of the information processing system 2. For example, as a result of the monitoring, the power consumption values of the physical partitions P in the information processing system 2 are obtained. The power consumption values are obtained by, for example, power measuring instruments (not illustrated) provided for the physical partitions P. The power measuring instruments may be implemented by known equipment. The processing in step S11 is performed periodically, for example, once every second.

The monitoring unit 122 also obtains information regarding the operating state of the information processing system 2 from each physical partition P therein and stores the obtained information in the monitor-information storage unit 143.

FIG. 6 illustrates an exemplary configuration of the monitor-information storage unit. In FIG. 6, the monitor-information storage unit 143 stores therein, for each physical partition P, monitor information including a physical partition name, an operating time, an average CPU usage rate, and so on.

The physical partition name is identification information of the corresponding physical partition P. DB1, AP1, AP2, Web1, Web2, Web3, and Test illustrated in FIG. 6 are the physical partition names of the physical partitions P0 to P6 in that order.

The operating time is the time that has elapsed from startup of the corresponding physical partition P. The average CPU usage rate is an average value of CPU usage rates from when the physical partition P was started up. The average CPU usage rate, however, may be an average value of CPU usage rates obtained in a most recent certain period of time. The time that has elapsed from the startup of the physical partition P may be determined, for example, by storing the startup time of the physical partition P and determining the time elapsed from the startup time.

In step S12 in FIG. 5, the priority determining unit 123 determines the priorities of the respective physical partitions P. The determination of the priorities may be made with reference to the system-information storage unit 142 and the monitor-information storage unit 143.

FIG. 7 is a table illustrating an exemplary configuration of the system-information storage unit. As illustrated in FIG. 7, the system-information storage unit 142 stores therein, for each physical partition P, a physical partition name, a setting order, mode switching, the number of installed CPUs, a minimum number of CPUs, an installed memory capacity, a minimum memory capacity, forced stopping, stopping method, and so on. Values of those items are preset by, for example, the user via the setting unit 121.

The setting order represents the order of priorities set by the user. A higher priority is set for the physical partition P that performs processing relating to a task that is more important from the user's viewpoint. The same priorities may be set for multiple physical partitions P. The mode switching represents whether or not switching to the power-saving mode is permitted. "ON" or "OFF" is set for the mode switching. "ON" indicates that switching to the power-saving mode is permitted. "OFF" indicates that switching to the power-saving mode is not permitted. The number of installed CPUs represents the total number of CPUs installed in the physical partition P. The minimum number of CPUs represents a minimum value of the number of CPUs to be operated in the normal mode. Thus, the table in FIG. 7 indicates that, for example, with respect to the physical partition P in which the number of installed CPUs is 8 and the minimum number of CPUs is 4, up to four CPUs can be switched to the power-saving mode. The number of installed CPUs and the minimum number of CPUs are examples of information indicating a limit value of power consumption limit reduced when the physical partition P is switched to the power-saving mode. This is because the number of CPUs that can be switched to the power-saving mode is calculated according to "number of installed CPUs"–"minimum number of CPUs", and the power consumption value to be reduced is determined based on the number of CPUs that can be switched to the power-saving mode.

The installed memory capacity represents the total capacity of the memories M installed in the corresponding physical partition P. The minimum memory capacity represents the minimum value of the capacity of the memory or memories to be operated in the normal mode. Thus, the table in FIG. 7 indicates that, for example, with respect to the physical partition P in which the installed memory capacity is 16 GB and the minimum memory capacity is 8 GB, the memories M corresponding to up to 8 GB can be switched to the power-saving mode. The installed memory capacity and the minimum memory capacity are examples of information indicating the limit value of power consumption to be reduced when the physical partition P is switched to the power-saving mode. This is because the capacity of the memory or memories M that can be switched to the power-saving mode is calculated according to "installed memory capacity"–"minimum memory capacity", and the power consumption value to be reduced is determined based on the capacity of the memory or memories M that can be switched to the power-saving mode.

The value of the minimum number of CPUs and the value of the minimum memory capacity are valid for the physical partition P for which the mode switching is set to "ON".

The "forced stopping" field indicates whether or not forced stopping is permitted. In the "forced stopping" field, "enabled" or "disabled" is set. The "enabled" indicates that the forced stopping is permitted. The "disabled" indicates that the forced stopping is not permitted.

The "stopping method" field indicates a forced-stopping method for the physical partition P for which the forced stopping indicates "enabled". In the present embodiment, any of suspension, shutdown, and power-off is specified as the stopping method. The term "suspension" refers to temporarily stopping processing of an operating system (OS). The physical partition P put into a suspension state can resume the processing of the OS from the stopped state. Thus, in the case of suspension, the effect on processing continuity is small. "Shutdown" refers to safely stopping the OS after executing synchronization processing of a filing system and termination processing of various services. "Shutdown" can also be said to be a safety-oriented stopping method. "Power-off" refers to forcibly disconnecting the power supply without waiting for the synchronization processing of the filing system, the termination processing of various services, and so on. "Shutdown" can also be said to be a speed-oriented stopping method.

When there is any physical partition P for which the mode switching is set to "OFF", the maximum allowable power value may be set to a value that is larger than or equal to the power consumption value obtained when the same physical partition P operates in the normal mode.

Also, when there is any physical partition P for which the minimum number of CPUs or the minimum memory capacity is set to a value exceeding 0, the maximum allowable power value may be set to a value that is larger than or equal to the power consumption value obtained when a number of CPUs or memories M specified as the minimum number of CPUs or the minimum memory capacity operate.

In addition, when there is any physical partition P for which the forced stopping is set to "disabled", the maximum allowable power value may be set to a value that is larger than or equal to the power consumption value obtained when the minimum number of components in the same physical partition P operate in the normal mode.

Through use of the system-information storage unit 142 (FIG. 7) and the monitor-information storage unit 143 (FIG. 6) as described above, the priority determining unit 123 determines the priorities of the physical partitions P in the following manner.

First, when the setting order has been set in the system-information storage unit 142 (that is, the order of priorities has been set by the user), the priority determining unit 123 directly employs the setting order as the order of priorities. With respect to the physical partitions P for which the same values are set for the priorities, the priority determining unit 123 distinguishes between the priorities, for example, by using the operating times or the average CPU usage rates stored in the monitor-information storage unit 143 (FIG. 6). That is, the priority of a physical partition P having a longer operating time or a higher average CPU usage rate is increased. This is because the physical partition P that is executing processing relating to a more important task is more likely to be operating continuously for a longer time or is more likely to have a larger load.

On the other hand, when the setting order has not been set, the priority determining unit 123 determines the priorities of the physical partitions P by a method that is substantially the same as the way of giving priorities to the physical partitions P for which the same values are set for the setting order.

In addition, on the basis of details of the processing executed by the physical partitions P, the priority determining unit 123 may automatically determine the priorities of the physical partitions P for which no setting order has been set or the physical partitions P for which the same values have been set for the setting order. In the present embodiment, higher priorities are given to the database server, the application servers, the web servers, and the server for tests in that order.

A priority determination result is stored in the control-state information storage unit 144. FIG. 8 is a table illustrating an exemplary configuration of the control-state information storage unit. As illustrated in FIG. 8, the control-state information storage unit 144 stores therein, for each physical partition P, a priority, the number of power-saving CPUs, a power-saving memory capacity, a stopping status, a stop-time power consumption value, and so on. The values of those items are sequentially updated as appropriate, in accordance with the progress of the processing in the control apparatus 10.

The "priority" represents a result of the determination made by the priority determining unit 123. The "number of power-saving CPUs" corresponds to the number of CPUs switched to the power-saving mode. The "power-saving memory capacity" corresponds to the capacity of the memory or memories M switched to the power-saving mode. The "stopping status" field indicates, when the physical partition P is in a stopped state, which of the stopping methods was used to stop the physical partition P. The "stop-time power consumption value" represents an estimated value or an actual measurement value of the power consumption value of the physical partition P when it is forcibly stopped.

In step S13 in FIG. 5, the monitoring unit 122 determines the difference between the total of the obtained power consumption values and the maximum allowable power value (that is, "maximum allowable power value"−"total of the power consumption values"). Subsequently, in step S14, the monitoring unit 122 determines whether or not the difference is smaller than or equal to the threshold α. In the present embodiment, the difference being smaller than or equal to the threshold α is one example of a certain condition. The certain condition is predetermined, for example. The threshold α is a value set depending on with what degree of margin the reduction of power consumption is to be started, and is stored in, for example, the control-information storage unit 141. When the value of the threshold α is 0, control for reduction of the power consumption is started when the total of the power consumption values is larger than or equal to the maximum allowable power value.

When the difference is smaller than or equal to the threshold α (Yes in step S14), the control apparatus 10 executes processing for switching the components to the reduced-power state in step S15. That is, the control apparatus either switches the components to the power-saving mode or forcibly stops the physical partition P.

When the difference is larger than the threshold α (No in step S14), the process proceeds to step S16 in which the monitoring unit 122 determines whether or not the difference is larger than a threshold β. The threshold β is a value that is set depending on with what degree of remaining capacity relative to the maximum allowable power value the returning from the reduced-power state is to be started, and is stored in, for example, the control-information storage unit 141. When the value of the threshold β is 0, control is started in order to resume from the reduced-power state when the total of the power consumption values is smaller than the maximum allowable power value. When the difference is larger than the threshold β (Yes in step S16), the process proceeds to step S17 in which the control apparatus 10 performs processing for returning from the reduced-power state. That is, the control apparatus 10 either switches the component(s) in the power-saving mode to the normal mode or starts up the forcibly stopped physical partition P.

When the difference is smaller than or equal to the threshold β (No in step S16), the process returns to step S11 without executing the processing for switching to the reduced-power state and the processing for returning from the reduced-power state.

Figure 9:
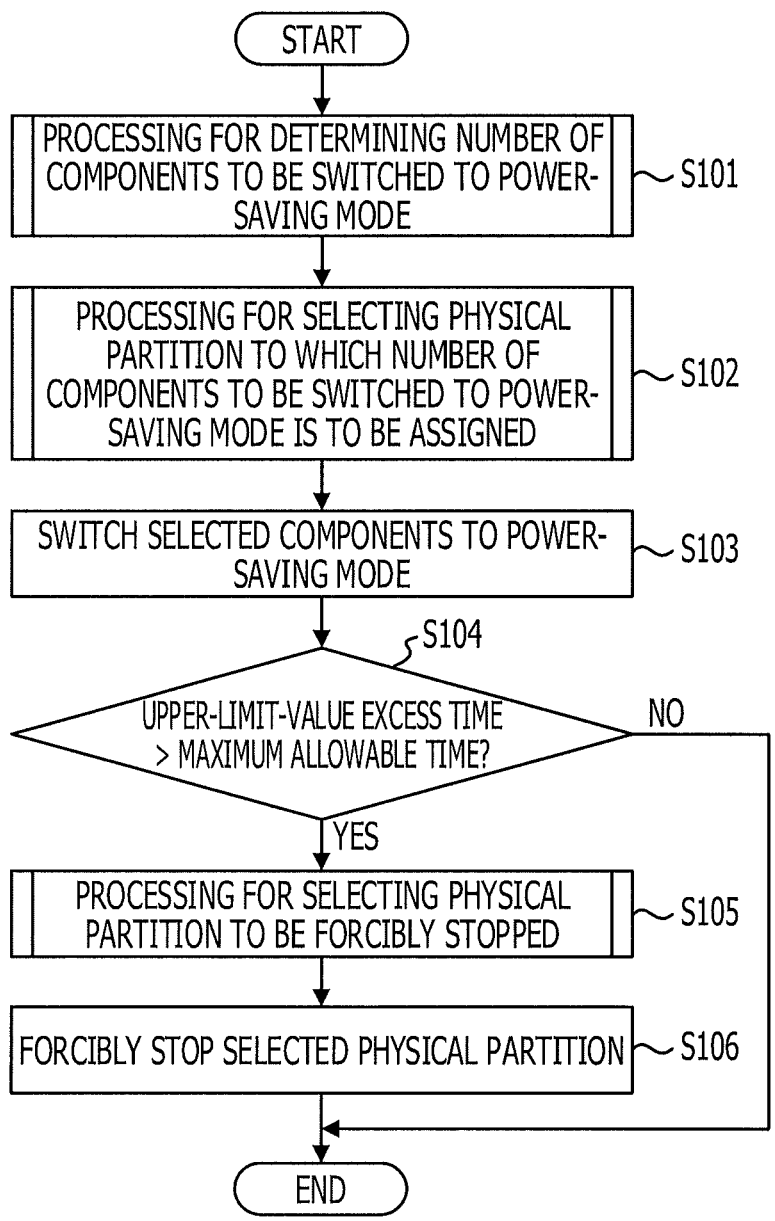
FIG. 9 is a flowchart illustrating one example of a procedure of processing for switching the components to a reduced-power state.

Next, a description will be given of details of step S15. FIG. 9 is a flowchart illustrating one example of a procedure of processing for switching the components to the reduced-power state.

In step S101, by referring to the system-information storage unit 142 and so on, the number-of-components-switched-to-power-saving-mode determining unit 124 determines the number of components to be switched to the power-saving mode. Subsequently, in step S102, the target-switched-to-power-saving-mode selecting unit 125 selects the physical partition P to which the number of components corresponding to the number determined in step S101 is to be assigned. In this case, multiple physical partitions P may be selected.

In step S103, the switching-to-power-saving-mode instructing unit 126 transmits, to the physical partition P selected in step S102, an instruction for switching the components corresponding to the number determined in step S101 to the power-saving mode. Upon receiving the switching instruction, the physical partition P switches the components corresponding to the number specified by the switching instruction to the power-saving mode. For example, the OS of the physical partition P may switch the components corresponding to the specified number to the power-saving mode. The possibility of reducing the power consumption increases as a result of switching to the power-saving mode.

In step S104, the upper-limit-value excess-time measuring unit 127 determines whether or not the upper-limit excess time exceeds the maximum allowable time. For example, when the total of the power consumption values obtained by the monitoring unit 122 exceeds the maximum allowable power value, the upper-limit-value excess-time measuring unit 127 turns a flag variable ON and stores that time (hereinafter referred to as "excess start time") in the memory device 103. When the total of the power consumption values is smaller than or equal to the maximum allowable power value, the upper-limit-value excess-time measuring unit 127 turns the flag variable OFF. When the flag variable is ON in step S104, the upper-limit-value excess-time measuring unit 127 sets the period of time from the excess start time to the present point in time as an upper-limit excess time. When the flag variable is OFF in step S104, the upper-limit-value excess-time measuring unit 127 sets the upper-limit excess time to 0.

When the upper-limit excess time exceeds the maximum allowable time (Yes in step S104), the process proceeds to step S105 in which the forced-stopping-target selecting unit 128 selects the physical partition P to be forcibly stopped. Subsequently, in step S106, the forced-stopping instructing unit 129 forcibly stops the physical partition P selected in step S105. The forced stopping is performed in accordance with the stopping method stored in the system-information storage unit 142 (FIG. 7). The forced-stopping instructing unit 129 stores the stopping method in the "stopping status" field in the control-state information storage unit 144 in association with the forcibly stopped physical partition P.

On the other hand, when the upper-limit excess time does not exceed the maximum allowable time (No in step S104), the physical partition P is not forcibly stopped.

Figure 10:
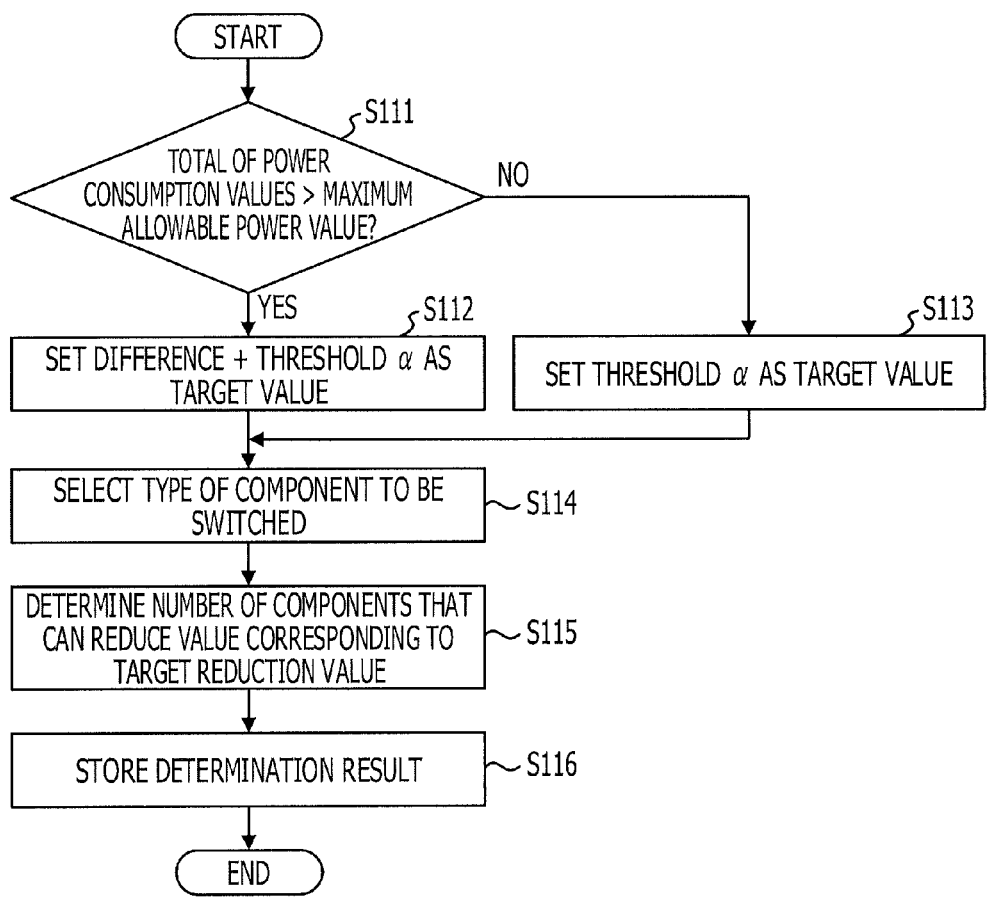
FIG. 10 is a flowchart illustrating one example of a procedure of processing for determining the number of components to be switched to the power-saving mode.

Next, a description will be given of details of step S101 in FIG. 9. FIG. 10 is a flowchart illustrating one example of a procedure of processing for determining the number of components to be switched to the power-saving mode.

In step S111, the number-of-components-switched-to-power-saving-mode determining unit 124 determines whether or not the total of the power consumption values is larger than the maximum allowable power value. When the total of the power consumption values is larger (Yes in step S111), the process proceeds to step S112 in which the number-of-components-switched-to-power-saving-mode determining unit 124 sets a value, obtained by adding the threshold α to the absolute value of a difference, as a target value for reducing the power consumption. The difference in this case corresponds to the value of "maximum allowable power value"–"total of power consumption values") determined in step S13 in FIG. 5. The threshold α corresponds to the threshold a in step S14 in FIG. 5. The absolute value of the difference may also be used as the target reduction value.

On the other hand, when the total of the power consumption values is smaller than or equal to the maximum allowable power value (No in step S111), the process proceeds to step S113 in which the number-of-components-switched-to-power-saving-mode determining unit 124 sets the threshold α as a target value for reducing the power consumption.

The target reduction value is one example of an amount of reduction in the power consumption value, the amount of reduction being determined by the difference between the total of the power consumption values and a value that is in a range in which the difference between the total of the power consumption values and the maximum allowable power value does not satisfy the certain condition (Difference≤Threshold α) and that is smaller than the maximum allowable power value.

Subsequent to step S112 or S113, the process proceeds to step S114 in which the number-of-components-switched-to-power-saving-mode determining unit 124 selects the type of component to be switched to the power-saving mode. In the present embodiment, types of components to be switched to the power-saving mode are a CPU and a memory M. Thus, one type, either a CPU or a memory M, is selected. An example of a method for the selection is described later.

In step S115, the number-of-components-switched-to-power-saving-mode determining unit 124 determines the number of components that can reduce the power consumption value corresponding to the target reduction value, when the components of the selected type are to be switched to the power-saving mode. The determination in step S115 is made, for example, with reference to the power-consumption-information storage unit 145.

FIG. 11 is a table illustrating an exemplary configuration of the power-consumption-information storage unit. In FIG. 11, with respect to each of the CPU and the memory, the power-consumption-information storage unit 145 stores therein, for each unit number of components, a normal-mode power consumption value, a power-saving-mode power consumption value, and the amount of reduction.

The unit number of components refers to the number of components that can be switched to the power-saving mode. The normal-mode power consumption value corresponds to the power consumption value in the normal mode. The power-saving-mode power consumption value corresponds to the power consumption value in the power-saving mode. The amount of reduction corresponds to the amount of reduction in the power consumption when the corresponding component(s) is switched to the power-saving mode. The amount of reduction is thus given by "amount of reduction"="normal-mode power consumption value"–"power-saving-mode power consumption value".

In step S115 in FIG. 10, with respect to the selected type of component, the number-of-components-switched-to-power-saving-mode determining unit 124 determines a minimum number corresponding to the amount of reduction that is larger than or equal to the target reduction value. For example, when the selected type of component is the memory M and the target reduction value is 10 watts, a result of the determination is 4 GB.

In step S116, the number-of-components-switched-to-power-saving-mode determining unit 124 stores the result determined in step S115. More specifically, for example, the type and the number of components to be switched to the power-saving mode are stored in the memory device 103 as the determination result.

A description will be given of one example of a method for the component-type selection performed in step S114. For example, the types of components may be alternately selected in order to ensure that one type of component is not intensively selected as targets to be switched to the power-saving mode. Thus, by referring to the previous determination result stored in the memory device 103, the number-of-components-switched-to-power-saving-mode determining unit 124 selects a type of component that is different from the previously selected one. Alternatively, in the example of FIG. 11, the amount of reduction for the minimum unit number of CPUs is 40 watts and the amount of reduction for the unit number of memories M is 4 watts. Thus, when the CPU is selected, there is a possibility that the amount of reduction is too large for the target reduction value. In order to reduce the occurrence of such cases, for example, adjustment may be made so that the CPU is selected once every five selection operations.

Figure 12:
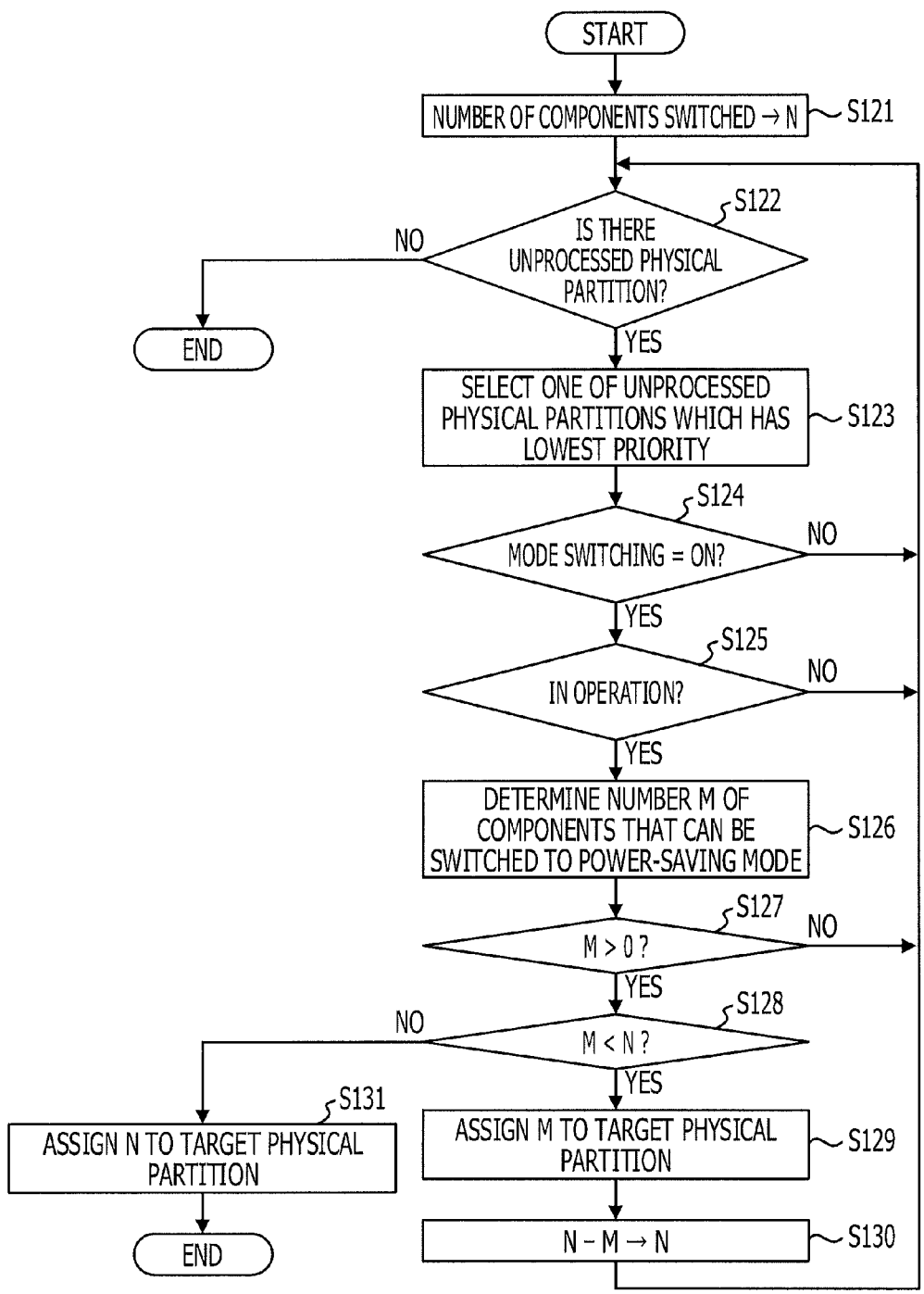
FIG. 12 is a flowchart illustrating one example of a procedure of processing for selecting a physical partition to which the number of components to be switched to the power-saving mode is to be assigned.

Next, a description will be given of details of step S103 in FIG. 9. FIG. 12 is a flowchart illustrating one example of a procedure of processing for selecting the physical partition to which the number of components to be switched to the power-saving mode is to be assigned.

In step S121, the target-switched-to-power-saving-mode selecting unit 125 assigns the number determined in the processing in FIG. 10 to a variable N. The variable N is a variable for storing the remaining value of the number of components to be switched to the power-saving mode. In step S122, the target-switched-to-power-saving-mode selecting unit 125 determines the whether or not there is any unprocessed physical partition P. The unprocessed physical partition P refers to a physical partition P that has not been subjected to the processing in FIG. 12. When there is no unprocessed physical partition P (No in step S122), the processing in FIG. 12 ends.

When there is any unprocessed physical partition P (Yes in step S122), the process proceeds to step S123 in which the target-switched-to-power-saving-mode selecting unit 125 selects, as a target to be processed, one of the unprocessed physical partitions P which has the lowest one of the priorities stored in the control-state information storage unit 144. The physical partition P selected as the target to be processed is hereinafter referred to as a "target physical partition P".

In step S124, the target-switched-to-power-saving-mode selecting unit 125 determines whether or not switching to the power-saving mode is permitted for the target physical partition P. This determination may be made with reference to the system-information storage unit 142 (FIG. 7). That is, when the value of the mode switching illustrated in FIG. 7 is ON for the target physical partition P, it is determined that switching to the power-saving mode is permitted for the target physical partition P. When switching to the power-saving mode is not permitted for the target physical partition P (No in step S124), the process returns to step S122.

When switching to the power-saving mode is permitted for the target physical partition P (Yes in step S124), the process proceeds to step S125 in which the target-switched-to-power-saving-mode selecting unit 125 determines whether or not the target physical partition P is in operation. This determination may be made with reference to the control-state information storage unit 144 (FIG. 8). That is, when no stopping-status value is stored in the control-state information storage unit 144 for the target physical partition P, the target physical partition P is determined to be in operation.

When the target physical partition P is in the stopped state (No in step S125), the process returns to step S122. When the target physical partition P is in operation (Yes in step S125), the process proceeds to step S126 in which, with respect to the target physical partition P, the target-switched-to-power-saving-mode selecting unit 125 determines the number M of components that can be switched to the power-saving mode. This determination may be made with reference to the system-information storage unit 142 (FIG. 7) and the control-state information storage unit 144 (FIG. 8). When the component type determined in the processing in FIG. 10 to be switched to the power-saving mode is the CPU, the number M is given by a calculation result ("number of installed CPUs"–"minimum number of CPUs"–"number of power-saving CPUs"). When the type of component to be switched to the power-saving mode is the memory M, the number M is given by a calculation result ("installed memory capacity"–"minimum memory capacity"–"power-saving memory capacity"). The number of installed CPUs, the minimum number of CPUs, the installed memory capacity, and the minimum memory capacity are stored in the system-information storage unit 142. The number of power-saving CPUs and the power-saving memory capacity are stored in the control-state information storage unit 144.

In step S127, the target-switched-to-power-saving-mode selecting unit 125 determines whether or not the number M is larger than 0. When the number M is 0 or smaller (No in step S127), the process returns to step S122.

When the number M is larger than 0 (Yes in step S127), the process proceeds to step S128 in which the target-switched-to-power-saving-mode selecting unit 125 determines whether or not the number M is smaller than the value of the variable N. That is, a determination is made as to whether or not the number M is smaller than the remaining value of the number of components to be switched to the power-saving mode.

When the number M is larger than or equal to the value of the variable N (No in step S128), the process proceeds to step S131 in which the target-switched-to-power-saving-mode selecting unit 125 assigns the number corresponding to the variable N to the target physical partition P. Thereafter, the processing in FIG. 12 ends. That is, the entire remaining value of the number of components to be switched to the power-saving mode is assigned to the target physical partition P. The target-switched-to-power-saving-mode selecting unit 125 stores the number of components, assigned to the target physical partition P, in the "number of power-saving CPUs" field or the "power-saving memory capacity" field in the control-state information storage unit 144 (FIG. 8).

On the other hand, when the number M is smaller than the value of the variable N (Yes in step S128), the process proceeds to step S129 in which the target-switched-to-power-saving-mode selecting unit 125 assigns the number M to the target physical partition P. The target-switched-to-power-saving-mode selecting unit 125 stores the number M, assigned to the target physical partition P, in the "number of power-saving CPUs" field or the "power-saving memory capacity" field in the control-state information storage unit 144 (FIG. 8).

Subsequently, in step S130, the target-switched-to-power-saving-mode selecting unit 125 assigns the variable N a value obtained by subtracting the number M from the variable N. The target-switched-to-power-saving-mode selecting unit 125 then repeats the processing in step S122 and the subsequent steps.

As a result of the above-described processing, the number of components to be switched to the power-saving mode is assigned to the physical partitions P in ascending order of the priorities thereof. When the process ends in response to the determination "No" in step S122, the target-switched-to-power-saving-mode selecting unit 125 may also store, in the memory device 103, an instruction indicating that the type of component to be switched to the power-saving mode the next time is to be different from the present type of component. The reason why such an instruction is stored is that, with the present type of component, it is difficult to reduce the power consumption corresponding to the target reduction value. When step S114 in FIG. 10 is executed the next time, the number-of-components-switched-to-power-saving-mode determining unit 124 may select a different type of component from the previously selected type on the basis of that instruction.

Alternatively, the processing in FIG. 10 may be continuously performed immediately after the process ends in response to the determination "No" in step S122. In this case, in step S114, a different type of component from the previously selected type may also be selected.

Figure 13:
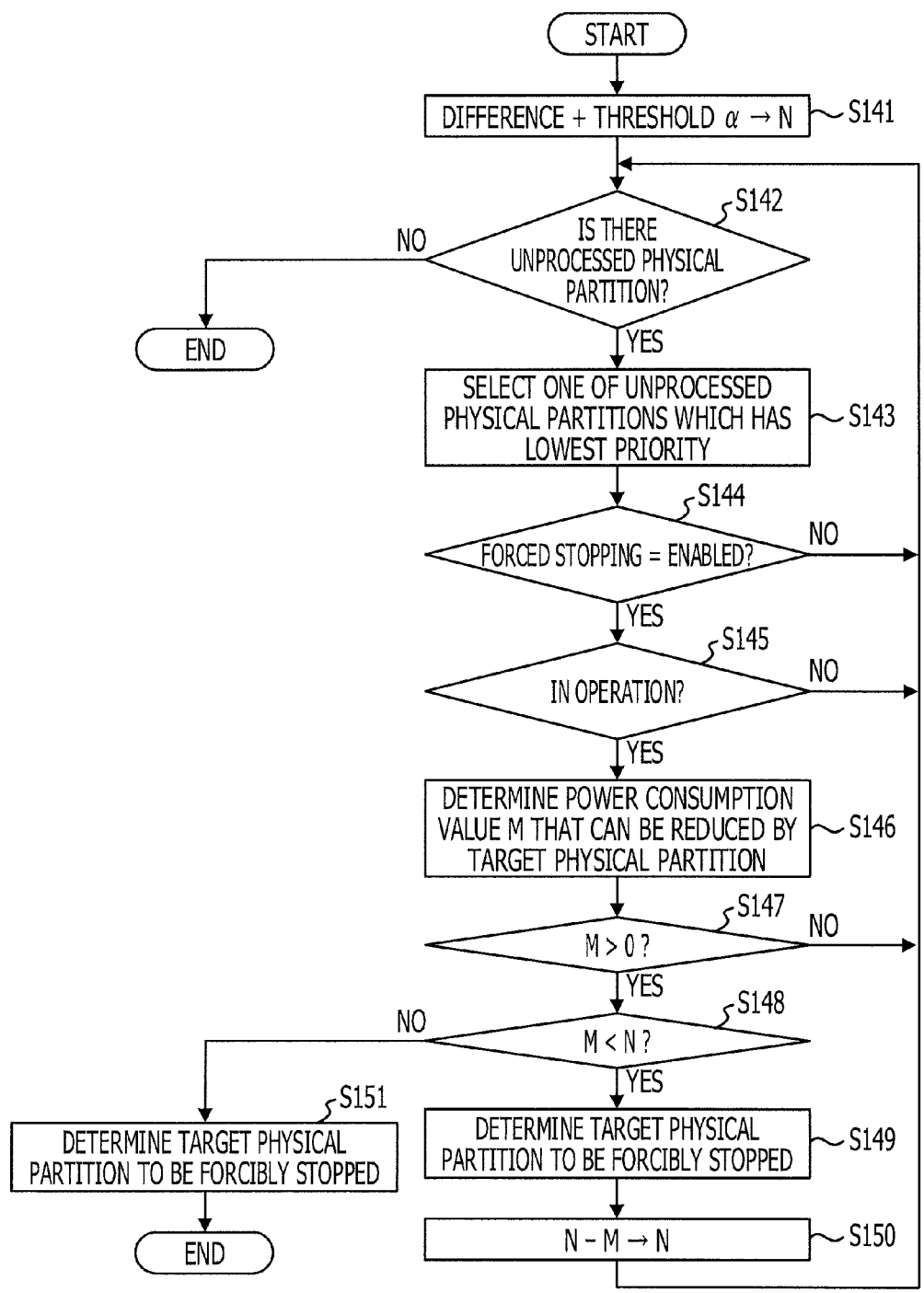
FIG. 13 is a flowchart illustrating one example of a procedure of processing for selecting a physical partition to be forcibly stopped.

Next, a description will be given of details of step S105 in FIG. 9. FIG. 13 is a flowchart illustrating one example of a procedure of processing for selecting the physical partition to be forcibly stopped.

In step S141, the forced-stopping-target selecting unit 128 assigns the variable N a value obtained by adding the threshold α to the difference between the total of the power consumption values and the maximum allowable power value. The total of the power consumption values is the value obtained in step S11 in FIG. 5. The threshold α corresponds to the threshold α in step S14 in FIG. 5. The variable N is a variable for storing the remaining value of the target reduction value for the power consumption. The difference between the total of the power consumption values and the maximum allowable power value may also be assigned to the variable N.

In step S142, the forced-stopping-target selecting unit 128 determines whether or not there is any unprocessed physical partition P. The unprocessed physical partition P refers to a physical partition P that has not been subjected to the processing in FIG. 13. When there is no unprocessed physical partition P (No in step S142), the processing in FIG. 13 ends.

When there is any unprocessed physical partition (Yes in step S142), the process proceeds to step S143 in which the forced-stopping-target selecting unit 128 selects one of the unprocessed physical partitions P which has the lowest one of the priorities stored in the control-state information storage unit 144 as a target to be processed. The physical partition P selected as the target to be processed is hereinafter referred to as a "target physical partition P".

In step S144, the forced-stopping-target selecting unit 128 determines whether or not the forced stopping is permitted for the target physical partition P. This determination may be made with reference to the system-information storage unit 142 (FIG. 7). That is, when a value of the forced stopping in FIG. 7 indicates "enabled" with respect to the target physical partition P, it is determined that the forced stopping is permitted. On the other hand, when the forced stopping is not permitted for the target physical partition P (No in step S144), the process returns to step S142.

When the forced stopping is permitted for the target physical partition P (Yes in step S144), the process proceeds to step S145 in which the forced-stopping-target selecting unit 128 determines whether or not the target physical partition P is in operation. This determination may be made with reference to the control-state information storage unit 144 (FIG. 8). That is, when the value of the stopping status is not stored in the control-state information storage unit 144 with respect to the target physical partition P, the target physical partition P is in operation.

When the target physical partition P is in the stopped state (No in step S145), the process returns to step S142. When the target physical partition P is in operation (Yes in step S145), the process proceeds to step S146 in which the forced-stopping-target selecting unit 128 determines a power consumption value M that can be reduced by stopping the target physical partition P. In the present embodiment, since the power consumption value is obtained for each physical partition P, the obtained power consumption value may be used as the power consumption value M.

When the power consumption values of the entire information processing system 2 are obtained, the power consumption value M that can be reduced by stopping the target physical partition P may also be determined, for example, with reference to the system-information storage unit 142 (FIG. 7), the control-state information storage unit 144 (FIG. 8), and the power-consumption-information storage unit 145 (FIG. 11).

More specifically, calculation of "number of installed CPUs"–"number of power-saving CPUs" makes it possible to determine the number of CPUs in the normal mode. Checking the number of CPUs in the normal mode and the value of the number of power-saving CPUs (that is, the number of CPUs in the power-saving mode) with the corresponding information stored in the power-consumption-information storage unit 145 (FIG. 11) makes it possible to obtain the power consumption value resulting from the CPUs in the normal mode and the power consumption value resulting from the CPUs in the power-saving mode. Similarly, calculation of "installed memory capacity"–"power-saving memory capacity" makes it possible to determine the memory capacity in the normal mode. Checking the memory capacity in the normal mode and the value of the power-saving memory capacity with the corresponding information stored in the power-consumption-information storage unit 145 (FIG. 11) makes it possible to obtain the power consumption value resulting from the memory capacity in the normal mode and the power consumption value resulting from the memory capacity in the power-saving mode. Summation of all of the obtained power consumption values yields the power consumption value M that can be reduced. The number of installed CPUs and the installed memory capacity are stored in the system-information storage unit 142. The number of power-saving CPUs and the power-saving memory capacity are stored in the control-state information storage unit 144. In each physical partition P, however, the components other than the CPUs and the memories M also consume power. Thus, for each physical partition P, the power consumption values of other components may also be stored in the system-information storage unit 142 (FIG. 7) or the like. In such a case, the power consumption values may also be added to the power consumption value M.

In step S147, the forced-stopping-target selecting unit 128 determines whether or not the power consumption value M is larger than 0. When the power consumption value M is smaller than or equal to 0 (No in step S147), the process returns to step S142.

When the power consumption value M is larger than 0 (Yes in step S147), the process proceeds to step S148 in which the forced-stopping-target selecting unit 128 determines whether or not the power consumption value M is smaller than the value of the variable N. That is, a determination is made as to whether or not the power consumption value M is smaller than or equal to the remaining value of the target reduction value.

When the power consumption value M is larger than or equal to the value of the variable N (No in step S148), the process proceeds to step S151 in which the forced-stopping-target selecting unit 128 determines that the target physical partition P is to be forcibly stopped and then ends the processing in FIG. 13. This is because the entire remaining value of the target reduction value can be handled by the target physical partition P. The forced-stopping-target selecting unit 128 stores the power consumption value M in the "stop-time power-consumption value" field in the control-state information storage unit 144 (FIG. 8) in association with the target physical partition P.

On the other hand, when the power consumption value M is smaller than the value of the variable N (Yes in step S148), the process proceeds to step S149 in which the forced-stopping-target selecting unit 128 determines that the target physical partition P is to be forcibly stopped. The forced-stopping-target selecting unit 128 stores the power consumption value M in the "stop-time power consumption value" field in the control-state information storage unit 144 (FIG. 8) in association with the target physical partition P.

Subsequently, in step S150, the forced-stopping-target selecting unit 128 assigns the variable N a value obtained by subtracting the power consumption value M from the variable N. The forced-stopping-target selecting unit 128 then repeats the processing in step S142 and the subsequent steps.

As a result of the above-described processing, the physical partitions P to be forcibly stopped are selected in ascending order of the priorities thereof.

When the result of the determination is step S145 is Yes, the target physical partition P may be selected as a target to be forcibly stopped and the processing in FIG. 13 may end. That is, the number of physical partitions P selected in the processing in FIG. 13 may be one. This is because, as a result of the stopping of the target physical partition P, there is also a possibility that a larger amount of power consumption than the power consumption value M estimated in step S146 can be reduced in practice. With the arrangement described above, the physical partitions P can be stopped one by one in accordance with the state of actual reduction of the power consumption.

Basically, the stop-time power consumption value stored in the control-state information storage unit 144 in step S149 or S151 corresponds to a power consumption value when the components that are included in the target physical partition P and that correspond to the number of components that can be switched to the power-saving mode are operating in the power-saving mode. This is because there is a high possibility that the processing in FIG. 13 is executed when the power consumption value of the information processing system 2 still does not fall below the maximum allowable power value after the components corresponding to the number of components that can be switched to the power-saving mode are switched to the power-saving mode. The number of components that can be switched to the power-saving mode refers to the number of components that can be switched to the power-saving mode taking into account the mode switching, the minimum number of CPUs, the minimum memory capacity, and so on stored in the system-information storage unit 142 (FIG. 6).

Figure 14:
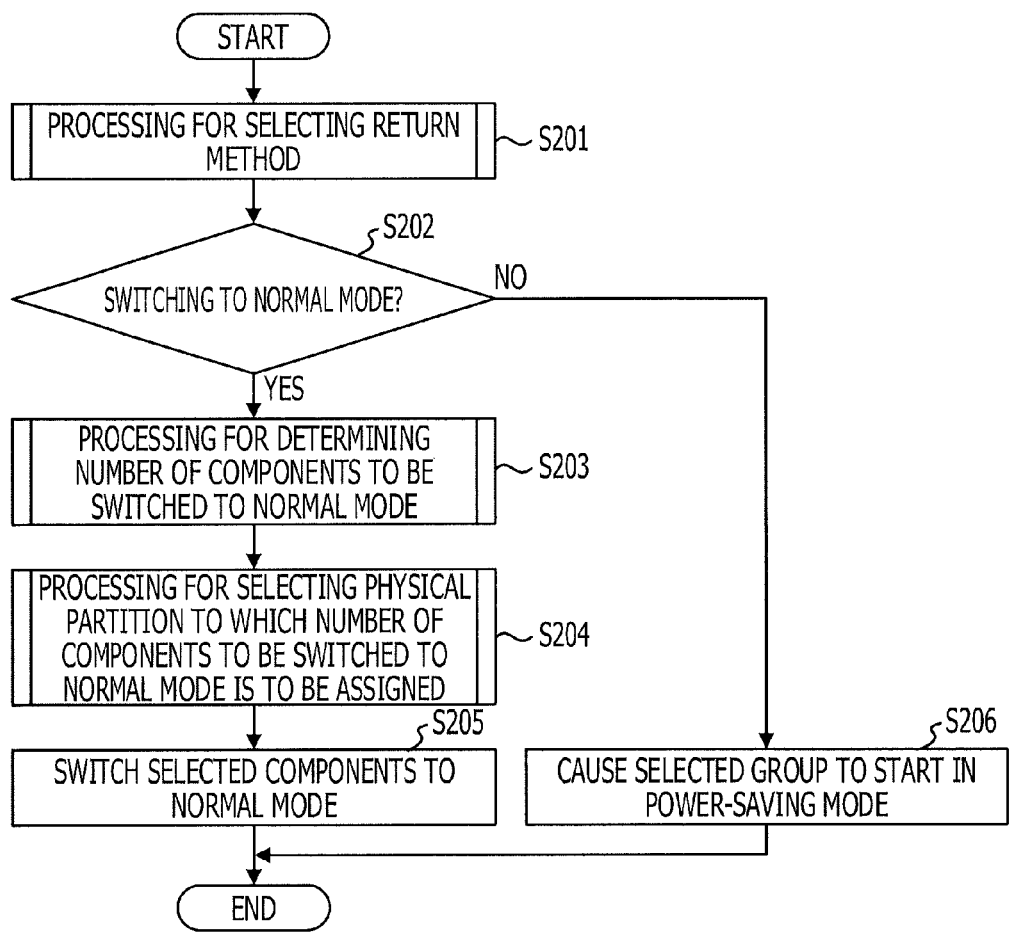
FIG. 14 is a flowchart illustrating one example of a procedure of processing for returning from the reduced-power state.

Next, a description will be given of details of step S17 in FIG. 5. FIG. 14 is a flowchart illustrating one example of a procedure of processing for returning from the reduced-power state.

In step S201, the return-method selecting unit 130 selects either returning the components switched to the power-saving mode to the normal mode or starting up the forcibly stopped physical partition P as a method for returning from the reduced-power state.

When returning to the normal mode is selected (Yes in step S202), the process proceeds to step S203 in which the number-of-components-switched-to-normal-mode determining unit 131 refers to the system-information storage unit 142 and so on to determine the number of components to be switched to the normal mode. Subsequently, in step S204, the target-switched-to-normal-mode selecting unit 132 selects the physical partition P to which the number of components corresponding to the number determined in step S203 is to be assigned. In this case, multiple physical partitions P may be selected.

In step S205, the switching-to-normal-mode instructing unit 133 transmits, to the physical partition P selected in step S204, an instruction for switching the components corresponding to the number determined in step S203 to the normal mode. Upon receiving the switching instruction, the physical partition P switches the components corresponding to the number specified by the switching instruction to the normal mode. For example, the OS of the physical partition P may switch the components corresponding to the specified number to the normal mode. As a result of switching to the normal mode, the processing performance of the physical partition P improves.

On the other hand, when starting up the forcibly stopped physical partition P is selected (No in step S202), the process proceeds to step S206 in which the startup instructing unit 135 causes the physical partition P, selected in step S201 as a target to be started up, to start up in the power-saving mode. Causing the physical partition P to start up in the power-saving mode means that the components corresponding to the number of components that can be switched to the power-saving mode are caused to start up in the power-saving mode. The method for starting up the physical partition P varies depending on the stopping method for forcibly stopping the physical partition P. Thus, the startup instructing unit 135 executes processing corresponding to the stopping method, stored in the system-information storage unit 142, with respect to the physical partition P. For example, when the stopping method is suspension, the startup instructing unit 135 resumes the processing of the OS of the physical partition P. When the stopping method is shutdown, the startup instructing unit 135 causes the physical partition P to operate in a normal state. When the stopping method is power-off, the startup instructing unit 135 powers on the physical partition P. When the startup succeeds, the startup instructing unit 135 deletes the stopping method, stored in the system-information storage unit 142, with respect to the physical partition P. This is because the stopping method is used to determine the startup and stopping of each physical partition P.

Figure 15:
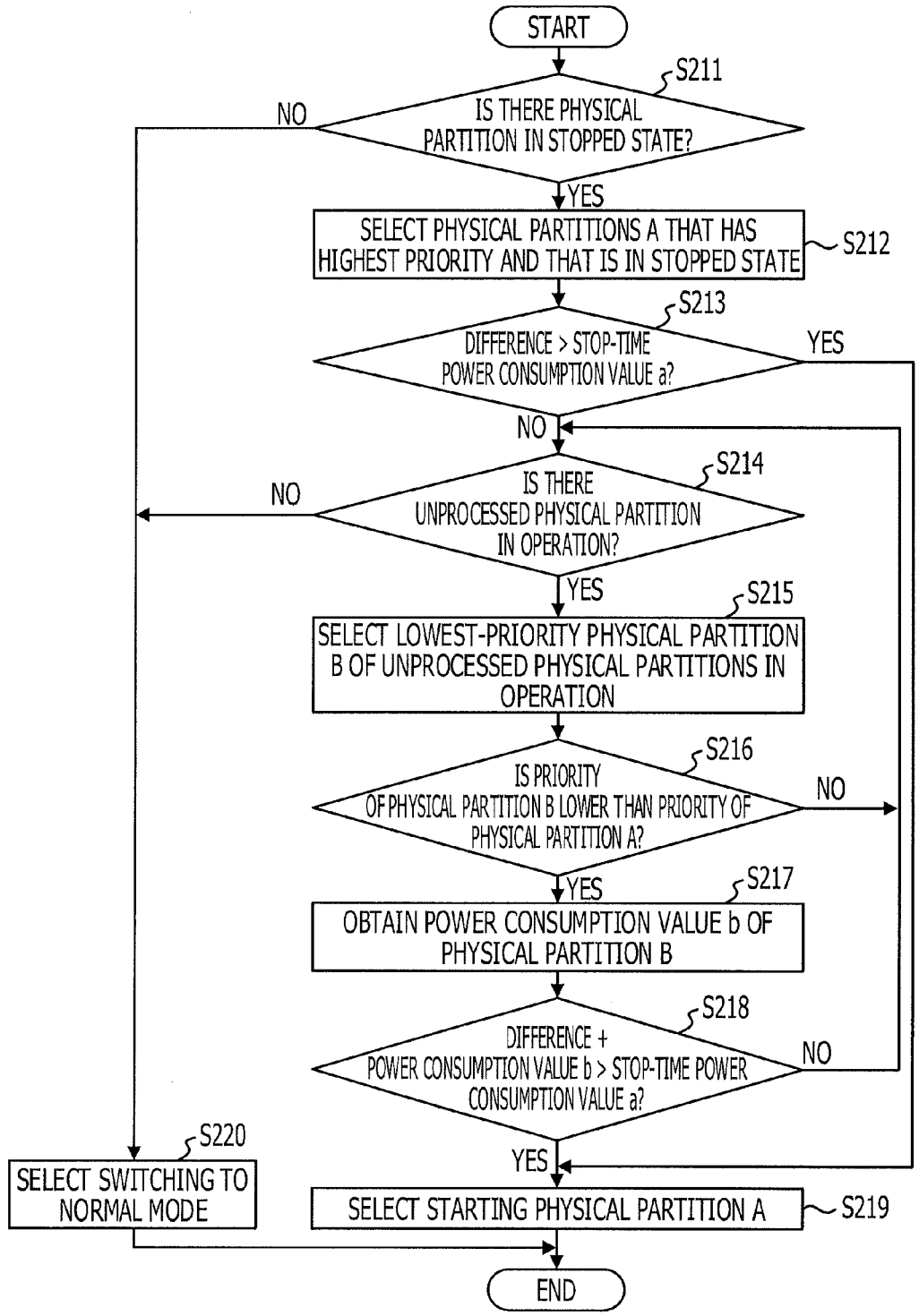
FIG. 15 is a flowchart illustrating one example of a procedure of processing for selecting a method for returning from the reduced-power state.

Next, a description will be given of details of step S201 in FIG. 14. FIG. 15 is a flowchart illustrating one example of a procedure of processing for selecting the method for returning from the reduced-power state.

In step S211, the return-method selecting unit 130 determines whether or not there is any physical partition P that is in the stopped state. For example, a determination is made as to whether or not there is a physical partition P for which a value is stored in the stopping status in the control-state information storage unit 144 (FIG. 8).

When no physical partition P is in the stopped state (No in step S211), the process proceeds to step S220 in which the return-method selecting unit 130 selects switching to the normal mode. When there is any physical partition P in the stopped state (Yes in step S211), the process proceeds to step S212 in which the return-method selecting unit 130 selects the highest-priority one of the physical partitions P in the stopped state as a candidate to be started up. The selected physical partition P is hereinafter referred to as a "physical partition A". The priority of each physical partition P may be determined with reference to the control-state information storage unit 144.

In step S213, with respect to the physical partition A, the return-method selecting unit 130 determines whether or not the stop-time power consumption value stored in the control-state information storage unit 144 (FIG. 8) is smaller than a difference. The stop-time power consumption value of the physical partition A is hereinafter referred to as a "stop-time power consumption value a". The difference corresponds to the difference determined in step S13 in FIG. 5 and the same also applies to the description below.

When the stop-time power consumption value a is smaller than the difference (Yes in step S213), the process proceeds to step S219 in which the return-method selecting unit 130 selects starting up the physical partition A. This is because, in this case, even when the physical partition A is started up, there is a high possibility that the power consumption value of the information processing system 2 falls below the maximum allowable power value.

On the other hand, when the stop-time power consumption value a is larger than or equal to the difference (No in step S213), there is a high possibility that, when the physical partition A is started up, the total of the power consumption values of the information processing system 2 exceeds the maximum allowable power value. However, when the physical partition P having a lower priority than that of the physical partition A is in operation, a case in which the physical partition P is stopped and the physical partition A is operated agrees with the priorities. Accordingly, the return-method selecting unit 130 stops the physical partition P that has a lower priority than that of the physical partition A and that is presently in operation, to thereby execute, in step S214 and the subsequent steps, processing for determining whether or not a margin corresponding to the power consumption value of the physical partition A can be ensured.

In step S214, the return-method selecting unit 130 determines whether or not there is any unprocessed one of the physical partitions P that are presently in operation. The term "unprocessed physical partition P" means that the physical partition P has not been subjected to the processing in step S215 and the subsequent steps. When there is no unprocessed physical partition P (No in step S214), the process proceeds to step S220 in which the return-method selecting unit 130 selects switching to the normal mode.

When there are one or more unprocessed physical partitions P (Yes in step S214), the process proceeds to step S215 in which the return-method selecting unit 130 selects the lowest-priority one of the unprocessed physical partitions P as a target to be processed. The selected physical partition P is hereinafter referred to as a "physical partition B".

In step S216, the return-method selecting unit 130 determines whether or not the priority of the physical partition B is lower than the priority of the physical partition A. When the priority of the physical partition B is higher (No in step S216), the process returns to step S214.

When the priority of the physical partition B is lower (Yes in step S216), the process proceeds to step S217 in which the return-method selecting unit 130 obtains the power consumption value of the physical partition B. The power consumption value of the physical partition B is hereinafter referred to as a "power consumption value b". The power consumption value b may be the value obtained by the monitoring unit 122. Alternatively, the power consumption value b may be determined by the same method as the method described in step S146 in FIG. 13.

In step S218, the return-method selecting unit 130 determines whether or not the sum of the difference and the power consumption value b is larger than the stop-time power consumption value a. That is, a determination is made as to whether or not a margin corresponding to an amount with which the physical partition A can be started up can be ensured relative to the maximum allowable power value when the physical partition B is stopped.

When the sum of the difference and the power consumption value b is larger than the stop-time power consumption value a (Yes in step S218), the process proceeds to step S219 in which the return-method selecting unit 130 selects starting up the physical partition A. In this case, when the physical partition B is stopped, there is a possibility that the power consumption value of the information processing system 2 can be reduced to a smaller value than the maximum allowable power value. For example, suppose a case in which the difference is 250 watts, the power consumption value b is 170 watts, and the stop-time power consumption value a is 400 watts. In this case, when the physical partition B is stopped, there is a high possibility that a margin of 420 (=250+170) watts can be ensured relative to the maximum allowable power value. In this case, even when the physical partition A is started up, there is a high possibility that the power consumption value of the information processing system 2 can be maintained to be a value that is lower than the maximum allowable power value by about 20 watts.

On the other hand, when the sum of the difference and the power consumption value b is smaller than or equal to the stop-time power consumption value a (No in step S218), the process returns to step S214.

When there is the physical partition B, the return-method selecting unit 130 may store the physical partition B in the memory device 103 as a target to be stopped. In such a case, the forced-stopping instructing unit 129 may forcibly stop the physical partition B before step S206 in FIG. 14.

However, even when the forced-stopping instructing unit 129 does not forcibly stop the physical partition B before step S206 in FIG. 14, there is a high possibility that the physical partition B is stopped during a next monitoring time. The next monitoring time refers to a period of time in which the processing in step S11 and the subsequent steps in FIG. 5 is executed the next time.

Figure 16:
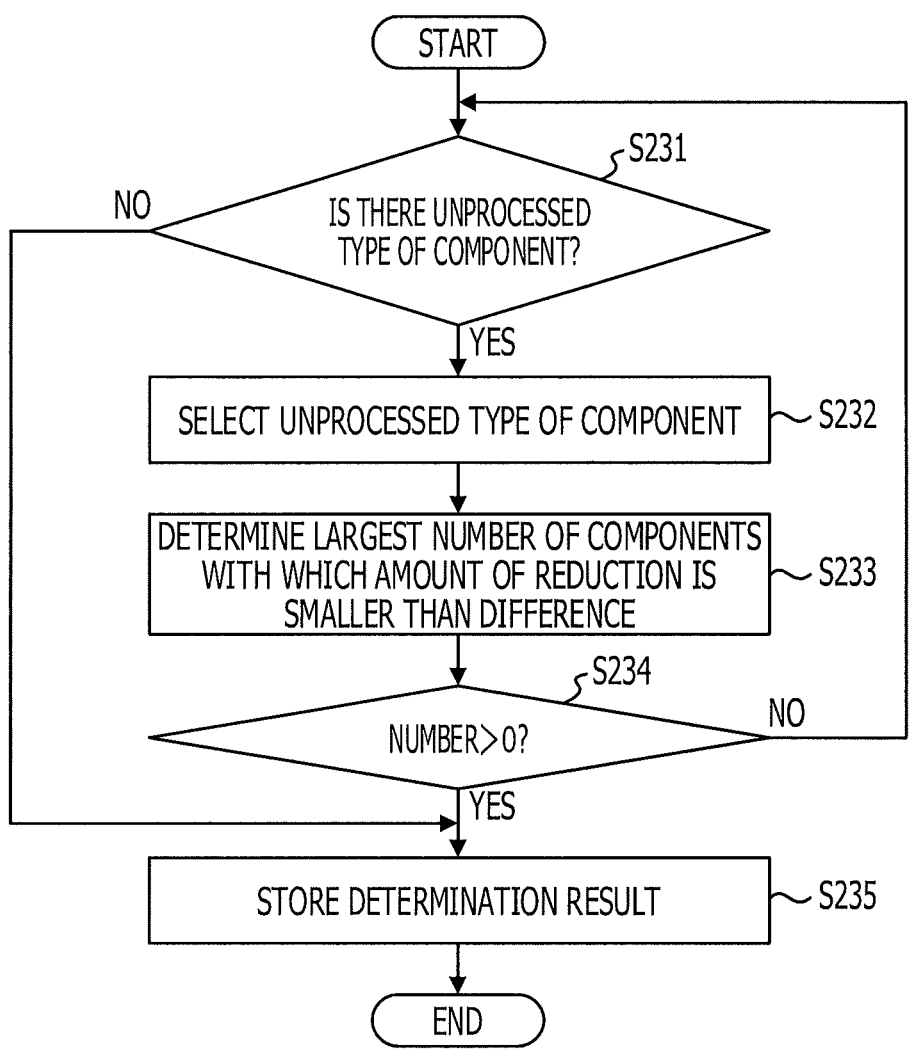
FIG. 16 is a flowchart illustrating one example of a procedure of processing for determining the number of components to be switched to the normal mode.

Next, a description will be given of details of step S203 in FIG. 14. FIG. 16 is a flowchart illustrating one example of a procedure of processing for determining the number of components to be switched to the normal mode.

In step S231, the number-of-components-switched-to-normal-mode determining unit 131 determines whether or not there is any unprocessed type of component. The unprocessed type of component refers to, of the CPU and the memory M, the type of component that has not been selected in step S232 and the subsequent steps as a target to be processed.

When there is any unprocessed type of component (Yes in step S231), the process proceeds to step S232 in which the number-of-components-switched-to-normal-mode determining unit 131 selects any of the unprocessed types of components as a target to be processed. The types of components may be selected, for example, in order of the CPU and the memory M or in its opposite order.

In step S233, the number-of-components-switched-to-normal-mode determining unit 131 refers to the power-consumption-information storage unit 145 (FIG. 11) to determine, with respect to the selected type of component, a largest number of components with which the amount of reduction is smaller than the above-described difference. For example, suppose a case in which the difference is 50 watts. In this case, when the selected type of component is the CPU, the largest number of components with which the amount of reduction is smaller than the difference is one. On the other hand, when the selected type of component is the memory M, the largest number of components with which the amount of reduction is smaller than the difference is 8 GB. For switching to the normal mode, the amount of reduction in FIG. 11 is regarded as an increase in the power consumption.

In step S234, the number-of-components-switched-to-normal-mode determining unit 131 determines whether or not the determined number is larger than 0. When the determined number is smaller than or equal to 0 (No in step S234), the process returns to step S231. When the determined number is larger than 0 (Yes in step S234), the number-of-components-switched-to-normal-mode determining unit 131 stores a determination result including the type and the number of components in, for example, the memory device 103.

When the number is smaller than or equal to 0 with respect to any type of component (No in step S234 and No in step S231), the process proceeds to step S235 in which the number-of-components-switched-to-normal-mode determining unit 131 stores a determination result indicating that the number of components to be switched to the normal mode is 0.

Figure 17:
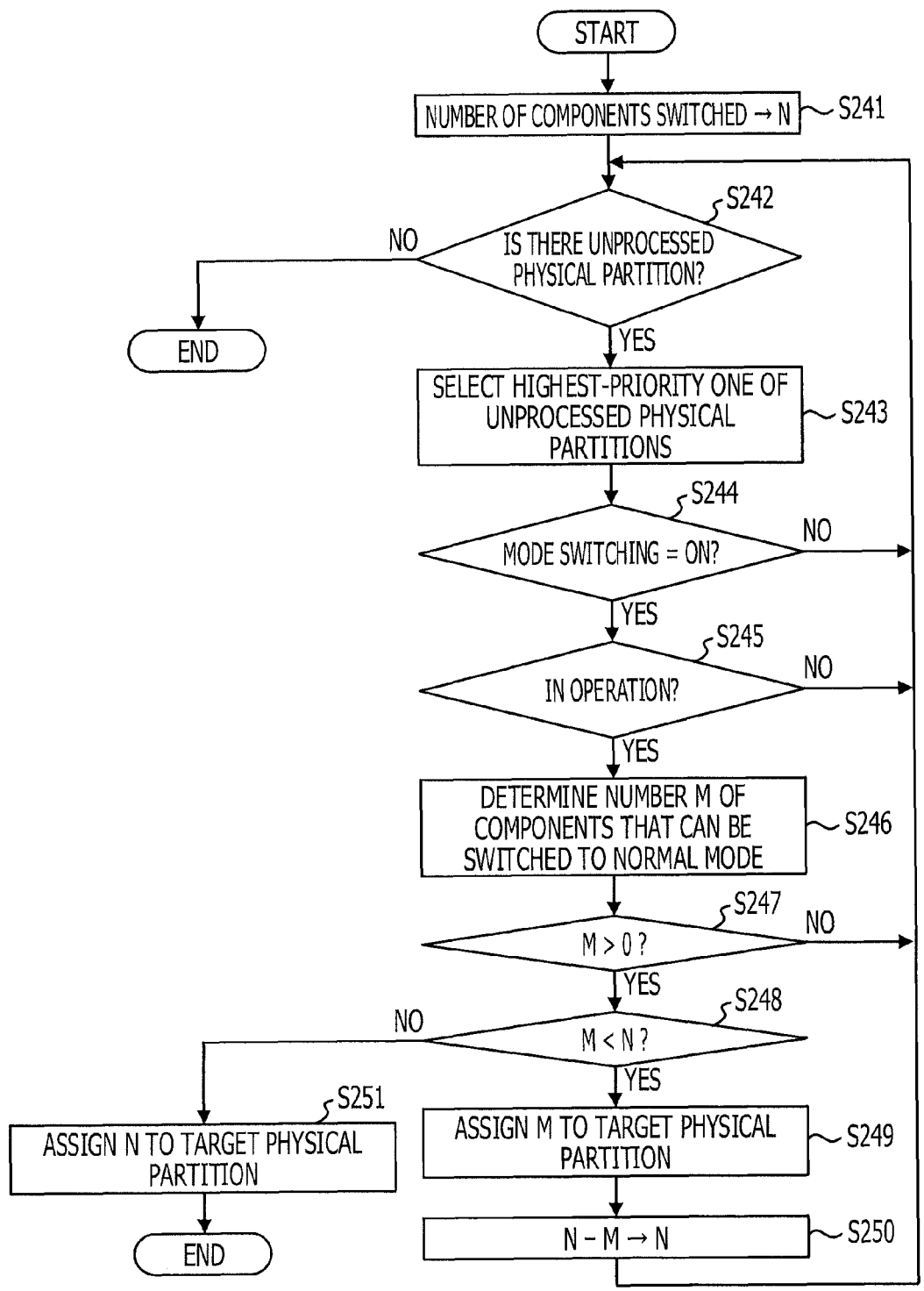
FIG. 17 is a flowchart illustrating one example of a procedure of processing for selecting a physical partition to which the number of components to be switched to the normal mode is to be assigned.

Next, a description will be given of details of step S204 in FIG. 14. FIG. 17 is a flowchart illustrating one example of a procedure of processing for selecting the physical partition to which the number of components to be switched to the normal mode is to be assigned. The processing in FIG. 17 is executed when the determination result in the processing in FIG. 16 indicates that the number of components is larger than 0.

In step S241, the target-switched-to-normal-mode selecting unit 132 assigns the number determined in the processing in FIG. 16 to a variable N. The variable N is a variable for storing a remaining value of the number of components to be switched to the normal mode. In step S242, the target-switched-to-normal-mode selecting unit 132 determines whether or not there is any unprocessed physical partition P. The unprocessed physical partition P refers to a physical partition P that has not been subjected to the processing in FIG. 17. When there is no unprocessed physical partition P (No in step S242), the processing in FIG. 17 ends.

When there is any unprocessed physical partition (Yes in step S242), the process proceeds to step S243 in which the target-switched-to-normal-mode selecting unit 132 selects, as a target to be processed, one of the unprocessed physical partitions P which has the highest one of the priorities stored in the control-state information storage unit 144. The physical partition P selected as the target to be processed is hereinafter referred to as a "target physical partition P".

In step S244, the target-switched-to-normal-mode selecting unit 132 determines whether or not switching to the power-saving mode is permitted for the target physical partition P. This determination may be made with reference to the system-information storage unit 142 (FIG. 7). That is, when the value of the mode switching illustrated in FIG. 7 is ON with respect to the target physical partition P, it is determined that switching to the power-saving mode is permitted for the target physical partition P. On the other hand, when switching to the power-saving mode is not permitted for the target physical partition P (No in step S244), the target physical partition P is not to be switched to the normal mode and then the process returns to step S242.

When switching to the power-saving mode is permitted for the target physical partition P (Yes in step S244), the process proceeds to step S245 in which the target-switched-to-normal-mode selecting unit 132 determines whether or not the target physical partition P is in operation. This determination may be made with reference to the control-state information storage unit 144 (FIG. 8). That is, when the value of the stopping status is not stored in the control-state information storage unit 144 with respect to the target physical partition P, the target physical partition P is in operation.

When the target physical partition P is in the stopped state (No in step S245), the process returns to step S242. When the target physical partition P is in operation (Yes in step S245), the process proceeds to step S246 in which, with respect to the target physical partition P, the target-switched-to-normal-mode selecting unit 132 determines the number M of components that can be switched to the normal mode. This determination may be made with reference to the system-information storage unit 142 (FIG. 7). When the type of component determined in the processing in FIG. 16 to be switched to the normal mode is the CPU, the number M corresponds to the value of the number of power-saving CPUs. On the other hand, when the type of component to be switched to the normal mode is the memory M, the number M corresponds to the value of the "power-saving memory capacity".

In step S247, the target-switched-to-normal-mode selecting unit 132 determines whether or not the number M is larger than 0. When the number M is smaller than or equal to 0 (No in step S247), the process returns to step S242.

When the number M is larger than 0 (Yes in step S247), the process proceeds to step S248 in which the target-switched-to-normal-mode selecting unit 132 determines whether or not the number M is smaller than the value of the variable N. That is, a determination is made as to whether or not the number M is smaller than or equal to the remaining value of the number of components to be switched to the normal mode.

When the number M is larger than or equal to the value of the variable N (No in step S248), the process proceeds to step S251 in which the target-switched-to-normal-mode selecting unit 132 assigns a number corresponding to the variable N to the target physical partition P. Thereafter, the processing in FIG. 17 ends. That is, the entire remaining value of the number of components to be switched to the normal mode is assigned to the target physical partition P. The target-switched-to-normal-mode selecting unit 132 subtracts the number, assigned to the target physical partition P, from the value in the "number of power-saving CPUs" field or the "power-saving memory capacity" field in the control-state information storage unit 144 (FIG. 8).

On the other hand, when the number M is smaller than the value of the variable N (Yes in step S248), the process proceeds to step S249 in which the target-switched-to-normal-mode selecting unit 132 assigns the number M to the target physical partition P. The target-switched-to-normal-mode selecting unit 132 subtracts the number, assigned to the target physical partition P, from the value in the "number of power-saving CPUs" field or the "power-saving memory capacity" field in the control-state information storage unit 144 (FIG. 8).

In step S250, the target-switched-to-normal-mode selecting unit 132 assigns the variable N a value obtained by subtracting the number M from the variable N. Subsequently, the target-switched-to-normal-mode selecting unit 132 repeats the processing in step S242 and the subsequent steps.

As a result of the above-described processing, the number of components to be switched to the normal mode is assigned in descending order of the priorities.

Although the above description has been given of an example in which the power mode is provided with two steps, that is, the normal mode and the power-saving mode, the power mode may also be divided into a larger number of modes. For example, adjusting the operating frequency in multiple steps for the CPUs makes it possible to provide the power mode with multiple steps. In such a case, the power-consumption-information storage unit 145 has a configuration, for example, as illustrated in FIG. 18. In the above-described example, with respect to the CPUs, the state in which the operating frequency is 50% is set as the power-saving mode.

FIG. 18 is a table illustrating a second exemplary configuration of the power-consumption-information storage unit. In FIG. 18, the power-consumption-information storage unit 145 stores therein a rate and the power consumption value for each operating frequency per CPU. The rate refers to the rate of the operating frequency when an operating frequency of 3.0 GHz is assumed to be 100%.

When the power mode is provided with multiple steps, the power mode may be switched according to the number of components and the rate. With such an arrangement, the power consumption can be controlled in a finer range of increase and decrease. The rates of the components to be switched simultaneously may be different from each other. In the above-described processing for switching the components to the normal mode, the rate may or may not be changed to 100%. That is, it is sufficient as long as the processing is performed so that the rate is increased compared to the present state.

In this case, the ranges of increase or decrease in the operating frequencies of some of the components may be widened so that the number of components whose operating frequencies are to be changed is reduced, so as to localize the range of influence. Alternatively, the ranges of decrease in the operating frequencies of the respective components may be minimized so that the ranges of decrease in the operating frequencies are equalized in the physical partition P. Which of the schemes is used may be preset in the system-information storage unit 142 or the like.

In such a case, the minimum number of CPUs in the system-information storage unit 142 may be set according to the above-described rate. For example, the minimum number of CPUs may also be set so that an operating frequency of at least 80% is ensured for each CPU.

Although the memory M is not illustrated in FIG. 18, the power mode for the memory M may also be provided with multiple steps.

In addition, a method for reducing the power consumption is not limited to reducing the operating frequency or the like. For example, the method for reducing the power consumption may be implemented by various known methods, such as reducing the number of instructions executed.

As described above, according to the first embodiment, a target whose power consumption is to be reduced or a target whose power consumption is to be increased (that is, a target that is to resume from the power-saving mode) is controlled according to the priorities set based on the details of processing executed by the respective physical partitions P. That is, the physical partitions P are selected in ascending order of the priorities thereof as targets to be switched to the power-saving mode or targets to be stopped. In addition, the physical partitions P are selected in descending order of the priorities thereof as targets to be switched to the normal mode or targets to be started up.

Accordingly, the time in which the performance of the physical partition P having a higher priority, that is, the physical partition P that executes more important processing in a task, decreases, or the time in which the physical partition P is in the stopped state can be reduced compared to the physical partition P having a lower priority. As a result, it is possible to reduce the influence that control of the power consumption of the information processing system 2 has on the user.

In addition, a determination is made so as to minimize the number of components to be switched to the power-saving mode. More specifically, a value in the range in which the condition that the value of "maximum allowable power value"–"total of the power consumption values" is smaller than or equal to the threshold α is not satisfied (for example, a maximum value that is in the range in which the condition is not satisfied and is smaller than the maximum allowable power value) is determined in step S112 or S113 in FIG. 10. The amount of reduction in the power consumption value, the amount being determined by the difference between that value in the range and the total of the power consumption values, is assigned to the physical partition P in ascending order of the priorities thereof so that the amount of reduction is within the range of a limit value of the physical partition P. Each physical partition P switches a number of components which corresponds to the assigned amount of reduction to the power-saving mode. It is, therefore, possible to localize the range affected by the control of the power consumption.

In addition, when the upper-limit excess time exceeds the maximum allowable time, the physical partition P is forcibly stopped. Thus, it is possible to quickly reduce the power consumption. In this case, the physical partitions P to be forcibly stopped are selected in ascending order of the priorities thereof. It is, therefore, possible to reduce the influence that the forced stopping of the physical partition P has on a task.

A second embodiment will be described next. In the second embodiment, a description will be given of points that are different from those in the first embodiment. Thus, points that are not particularly stated may be substantially the same as those in the first embodiment.

Figure 19:
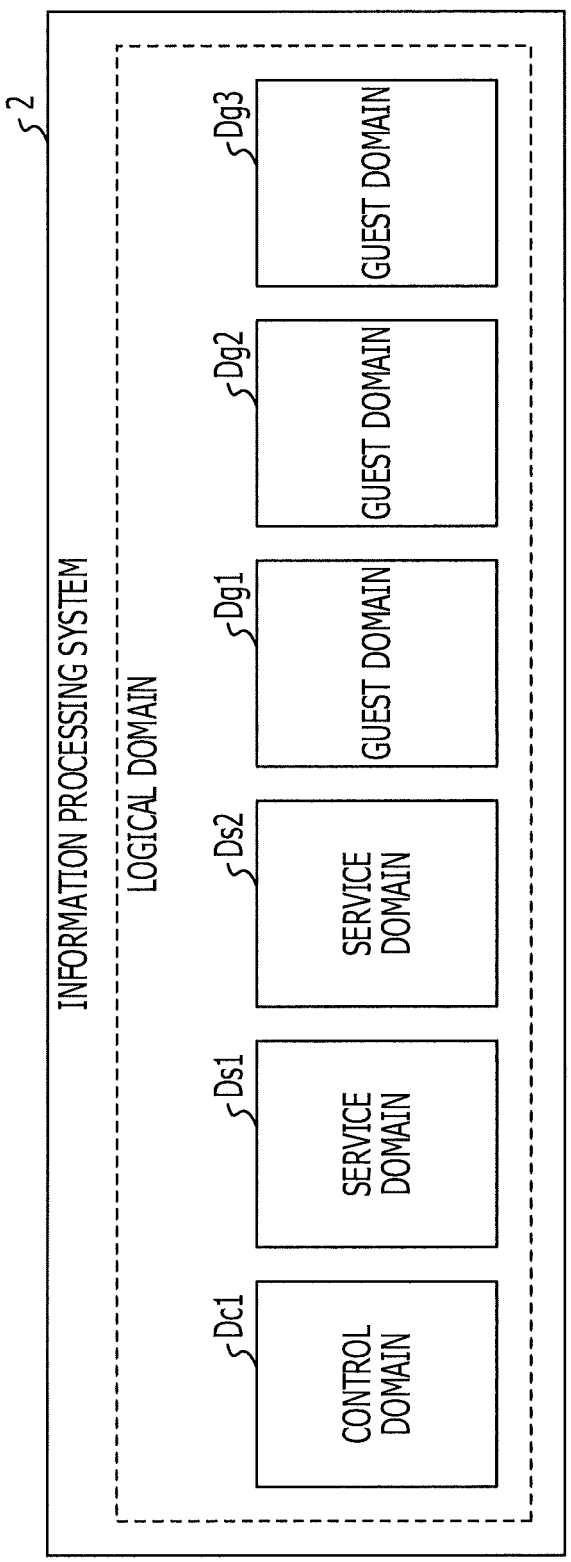
FIG. 19 is a diagram illustrating an exemplary configuration of an information processing system according to a second embodiment.

FIG. 19 is a diagram illustrating an exemplary configuration of an information processing system in the second embodiment. In FIG. 19, an information processing system 2 includes six logical domains, namely, a control domain Dc1, service domains Ds1 and Ds2, and guest domains Dg1, Dg2, and Dg3.

The logical domain corresponds to one or more virtual machines that can run on a single computer by a virtualization technology. That is, the logical domain is one example of a virtual computer.

The control domain Dc1 is a logical domain that manages resources of other logical domains. The service domain Ds is a logical domain that provides the guest domains Dg with services regarding virtualized devices. The guest domains Dg are logical domains that use the services, provided by the service domains Ds, to execute applications and so on.

Thus, the relationship of importance of the logical domains Dc1, Ds, and Dg is given by the control domain Dc1>the service domains Ds>the guest domains Dg. That is, the control domain Dc1 is the most important logical domain. This is because an operation of the control domain Dc1 affects all of the other logical domains.

In the second embodiment, the physical partition P in the first embodiment may be replaced with the logical domain D. A procedure in the second embodiment may be executed as in the first embodiment.

In the second embodiment, however, the control apparatus 10 may be the control domain Dc1 or a hypervisor.

With respect to logical domains D for which priorities have not been set by the user or logical domains D for which the same priorities are set, the priority determining unit 123 assigns priorities to the logical domains D on the basis of the relationship of the control domain Dc1>the service domains Ds>the guest domains Dg.

As described above, according to the second embodiment, advantages that are substantially the same as those in the first embodiment can be provided with respect to control of power consumption of virtual computers.

In each embodiment described above, the monitoring unit 122 is one example of a determining unit. The control-state information storage unit 144 is one example of a first storage unit and a third storage unit. The target-switched-to-power-saving-mode selecting unit 125 is one example of a first selecting unit. The switching-to-power-saving-mode instructing unit 126 is one example of a first switching unit. The system-information storage unit 142 is one example of a second storage unit. The target-switched-to-normal-mode selecting unit 132 is one example of a second selecting unit. The switching-to-normal-mode instructing unit 133 is one example of a second switching unit. The forced-stopping-target selecting unit 128 is one example of a third selecting unit. The forced-stopping instructing unit 129 is one example of a stopping unit. The startup-target selecting unit 134 is one example of a fourth selecting unit. The startup instructing unit 135 is one example of a starting unit.

While the embodiments have been described above in detail, the present disclosure is not limited to the particular embodiments and various changes and modifications are possible thereto without departing from the spirit and scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory; and
   a processor coupled to the memory and configured to:
      determine whether or not a first difference between a total of power consumption values of physical or virtual computers and a preset upper-limit value satisfies a certain condition, each of the computers including a plurality of components which are used to execute processing by each of the computers;
      determine, when the first difference satisfies the certain condition, a total number of components to be switched from a normal state to a power-saving state in which power of each component is to be reduced compared to the normal state, based on a target reduction value of power consumption obtained from a second difference between the total of power consumption values and a target value which is equal to or smaller than the upper-limit value;
      select, in ascending order of priorities stored in a first storage and set based on details of processing executed by the computers, any of the computers which includes a target component to be switched to the power-saving state corresponding to one of the determined total number of components, the target component being included in the plurality of components; and
      switch the target component included in the selected computer to the power-saving state,
   wherein, by referring to a second storage in which information indicating a minimum number of components which is operated in the normal state in each of the computers, the processor is configured to
      determine a number of target components to be switched to the power-saving state for each of the selected computers based on a difference between a number of components included in each of the computers and the minimum number of components in each of the computers, so that at least a remaining number of components are operated in the normal state,
      assign the determined number of target components each of which is to be switched to the power-saving state for each of the selected computers, and
      switch the assigned target components in each of the computers to the power-saving state.

2. The information processing apparatus according to claim 1, wherein the processor is configured to:
   select, in descending order of the priorities, any of the computers as a target whose power consumption is to be increased, when the total falls below the upper-limit value in a range in which the difference between the total and the upper-limit value does not satisfy the certain condition, and
   switch the computer selected to a state in which the power consumption increases.

3. The information processing apparatus according to claim 1, wherein the processor is configured to:
   select, in ascending order of the priorities, any of the computers as a target to be stopped, when the total exceeds the upper-limit value continuously for a certain amount of time, and
   stop the computer selected.

4. The information processing apparatus according to claim 3,
   wherein the processor is configured to:
      store the power consumption value of the selected computer in a third storage,
      select, in descending order of the priorities, any stopped one of the computers as a target to be started up, when the total falls below the upper-limit value, the power consumption value of the stopped computer being stored in the third storage and being smaller than the difference between the total and the upper-limit value, and
      start up the computer selected.

5. The information processing apparatus according to claim 4,
   wherein, even when the power consumption value stored in the third storage with respect to any of stopped computers which has a highest one of the priorities is larger than or equal to the difference between the total and the upper-limit value, the processor is configured to select the computer having the highest priority as a target to be started up, provided that the stored power consumption value is smaller than a sum of the power consumption value of a computer that is in operation and that has a lower priority than the priority of the computer having the highest priority and the difference between the total and the upper-limit value.

6. A control method of an information apparatus, the control method comprising:
   determining whether or not a first difference between a total of power consumption values of physical or virtual computers and a preset upper-limit value satisfies a certain condition, each of the computers including a plurality of components which are used to execute processing by each of the computers;
   determining, when the first difference satisfies the certain condition, a total number of components to be switched from a normal state to a power-saving state in which power of each component is to be reduced compared to the normal state, based on a target reduction value of power consumption obtained from a second difference between the total of power consumption values and a target value which is equal to or smaller than the upper-limit value;

selecting, in ascending order of priorities stored in a first storage and set based on details of processing executed by the computers, any of the computers which includes a target component to be switched to the power-saving state corresponding to one of the determined total number of components, the target component being included in the plurality of components, the selecting including referring to a second storage in which information indicating a minimum number of components which is operated in the normal state in each of the computers;

switching the target component included in the selected computer to the power-saving state;

determining a number of target components to be switched to the power-saving state for each of the selected computers based on a difference between a number of components included in each of the computers and the minimum number of components in each of the computers, so that at least a remaining number of components are operated in the normal state; and assigning the determined number of target components each of which is to be switched to the power-saving state for each of the selected computers, wherein the switching includes switching the assigned target components in each of the computers to the power-saving state.

7. The control method according to claim 6, further comprising:

selecting, in descending order of the priorities, any of the computers as a target whose power consumption is to be increased, when the total falls below the upper-limit value in a range in which the difference between the total and the upper-limit value does not satisfy the certain condition; and switching the selected computer to a state in which the power consumption increases.

8. The control method according to claim 6, further comprising:

selecting, in ascending order of the priorities, any of the computers as a target to be stopped, when the total exceeds the upper-limit value continuously for a certain amount of time; and stopping the selected computer.

9. The control method according to claim 8, wherein the selecting any of the computers as the target to be stopped includes storing the power consumption value of the selected computer in a third storage, the control method further comprising:

selecting, in descending order of the priorities, any stopped one of the computers as a target to be started up, when the total falls below the upper-limit value, the power consumption value of the stopped computer being stored in the third storage and being smaller than the difference between the total and the upper-limit value; and starting up the selected computer.

10. The control method according to claim 9, wherein, even when the power consumption value stored in the third storage with respect to any of stopped computers which has a highest one of the priorities is larger than or equal to the difference between the total and the upper-limit value, the selecting any stopped one of the computers as a target to be started up includes selecting the computer having the highest priority as the target to be started up, provided that the stored power consumption value is smaller than a sum of the power consumption value of a computer that is in operation and that has a lower priority than the priority of the computer having the highest priority and the difference between the total and the upper-limit value.

11. A non-transitory computer-readable recording medium storing a control program for causing an information processing apparatus to execute an operation, the operation comprising:

determining whether or not a first difference between a total of power consumption values of physical or virtual computers and a preset upper-limit value satisfies a certain condition, each of the computers including a plurality of components which are used to execute processing by each of the computers;

determining, when the first difference satisfies the certain condition, a total number of components to be switched from a normal state to a power-saving state in which power of each component is to be reduced compared to the normal state, based on a target reduction value of power consumption obtained from a second difference between the total of power consumption values and a target value which is equal to or smaller than the upper-limit value;

selecting, in ascending order of priorities stored in a first storage and set based on details of processing executed by the computers, any of the computers which includes a target component to be switched to the power-saving state corresponding to one of the determined total number of components, the target component being included in the plurality of components, the selecting including referring to a second storage in which information indicating a minimum number of components which is operated in the normal state in each of the computers;

switching the target component included in the selected computer to the power-saving state determining a number of target components to be switched to the power-saving state for each of the selected computers based on a difference between a number of components included in each of the computers and the minimum number of components in each of the computers, so that at least a remaining number of components are operated in the normal state; and assigning the determined number of target components each of which is to be switched to the power-saving state for each of the selected computers, wherein the switching includes switching the assigned target components in each of the computers to the power-saving state.

12. The non-transitory computer-readable recording medium according to claim 11, the operation further comprising:

selecting, in descending order of the priorities, any of the computers as a target whose power consumption is to be increased, when the total falls below the upper-limit value in a range in which the difference between the total and the upper-limit value does not satisfy the certain condition; and switching the selected computer to a state in which the power consumption increases.

13. The non-transitory computer-readable recording medium according to claim 11, the operation further comprising:

selecting, in ascending order of the priorities, any of the computers as a target to be stopped, when the total exceeds the upper-limit value continuously for a certain amount of time; and stopping the selected computer.

14. The non-transitory computer-readable recording medium according to claim 13,
wherein the selecting any of the computers as the target to be stopped includes storing the power consumption value of the selected computer in a third storage, the operation further comprising:
selecting, in descending order of the priorities, any stopped one of the computers as a target to be started up, when the total falls below the upper-limit value, the power consumption value of the stopped computer being stored in the third storage and being smaller than the difference between the total and the upper-limit value; and
starting up the selected computer.

15. The information processing apparatus according to claim 1, wherein
each of the computers is allocated to execute one of logical domains including a control domain that manages other logical domains, a service domain that provides a guest domain and the guest domain that executes an application program, each of the logical domains corresponds to one or more virtual machines executed on each of the computers, and
the priority of the computer is determined based on the type of the logical domain the computer is executing.

16. The information processing apparatus according to claim 15, wherein
the priority of the computer executing operations of the control domain is higher than the priority of the computer executing operations of the service domain, and
the priority of the computer executing operations of the service domain is higher than the priority of the computer executing operations of the guest domain.

* * * * *